US012799353B2

(12) United States Patent
Noguchi et al.

(10) Patent No.: US 12,799,353 B2
(45) Date of Patent: Nov. 17, 2026

(54) ELECTROPHOTOGRAPHIC ROLLER, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Atsushi Noguchi, Shizuoka (JP); Minoru Nakamura, Shizuoka (JP); Yoshitaka Suzumura, Shizuoka (JP); Souya Yamane, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 430 days.

(21) Appl. No.: 18/587,002

(22) Filed: Feb. 26, 2024

(65) Prior Publication Data

US 2024/0301236 A1 Sep. 12, 2024

(30) Foreign Application Priority Data

Mar. 1, 2023 (JP) ................................ 2023-031188

(51) Int. Cl.
*C09D 175/04* (2006.01)
*C08G 18/10* (2006.01)
(Continued)

(52) U.S. Cl.
CPC ........... *C09D 175/04* (2013.01); *C08G 18/10* (2013.01); *C08G 18/44* (2013.01); *C08G 18/4854* (2013.01); *C08G 18/5024* (2013.01); *C08G 18/7621* (2013.01); *C08G 18/7671* (2013.01); *G03G 15/0291* (2013.01);
(Continued)

(58) Field of Classification Search
CPC ...... C09D 175/04; C08G 18/10; C08G 18/44; C08G 18/4854; C08G 18/5024; C08G 18/7621; C08G 18/7671; G03G 15/0291; G03G 21/1814; G03G 2215/00957; G03G 2215/00962
See application file for complete search history.

(56) References Cited

U.S. PATENT DOCUMENTS 7,727,134 B2 6/2010 Nakamura
7,797,833 B2 9/2010 Nakamura
(Continued)

FOREIGN PATENT DOCUMENTS

JP 2012-237857 A 12/2012
JP 2017-191316 A 10/2017

*Primary Examiner* — Boone Alexander Evans
(74) *Attorney, Agent, or Firm* — VENABLE LLP

(57) ABSTRACT

An electrophotographic roller comprising a substrate comprising a conductive outer surface and a resin layer on the outer surface of the substrate, wherein the resin layer comprises a polyurethane having a polycarbonate structure, an impedance at a frequency of $1.0\times10^{0}$ to $1.0\times10^{1}$ Hz is $1.00\times10^{6}\Omega$ or more when a specific AC voltage is applied to the outer surface of the electrophotographic roller while a frequency is changed between specific range, and when a corona discharger having a grid part is moved along an axial direction of the electrophotographic roller at a speed of 400 mm/sec, a maximum value of an electric potential of the outer surface is less than 20.0 V when measured at 0.06 seconds after a passage of the grid part.

12 Claims, 6 Drawing Sheets

(51) Int. Cl.

| | |
|---|---|
| ***C08G 18/44*** | (2006.01) |
| ***C08G 18/48*** | (2006.01) |
| ***C08G 18/50*** | (2006.01) |
| ***C08G 18/76*** | (2006.01) |
| ***G03G 15/02*** | (2006.01) |
| ***G03G 21/18*** | (2006.01) |

(52) U.S. Cl.

CPC .................. *G03G 21/1814* (2013.01); *G03G 2215/00957* (2013.01); *G03G 2215/00962* (2013.01)

(56) References Cited

U.S. PATENT DOCUMENTS

| | | | | |
|---|---|---|---|---|
| 7,798,948 | B2 | 9/2010 | Kawamura | |
| 7,799,398 | B2 | 9/2010 | Nakamura | |
| 8,655,222 | B2 | 2/2014 | Nakamura | |
| 8,768,227 | B2 | 7/2014 | Urushihara | |
| 8,798,508 | B2 | 8/2014 | Yamada | |
| 9,625,854 | B2 | 4/2017 | Koyanagi | |
| 9,846,407 | B2 | 12/2017 | Nakamura | |
| 9,952,531 | B2 | 4/2018 | Ishii | |
| 10,310,447 | B2 | 6/2019 | Morishita | |
| 10,571,825 | B1 | 2/2020 | Urushihara | |
| 10,635,019 | B2 | 4/2020 | Doi | |
| 10,642,186 | B2 | 5/2020 | Sakurai | |
| 10,678,161 | B2 | 6/2020 | Tsuru | |
| 10,705,449 | B2 | 7/2020 | Ishida | |
| 10,712,684 | B2 | 7/2020 | Wakabayashi | |
| 10,732,538 | B2 | 8/2020 | Moriari | |
| 10,831,126 | B2 | 11/2020 | Matsunaga | |
| 10,831,127 | B2 | 11/2020 | Utsuno | |
| 10,976,683 | B2 | 4/2021 | Ishida | |
| 11,256,191 | B2 | 2/2022 | Takeno | |
| 11,360,405 | B2 | 6/2022 | Tomono | |
| 11,360,426 | B2 | 6/2022 | Suzumura | |
| 11,397,388 | B2 * | 7/2022 | Nishioka | G03G 15/0233 |
| 11,465,383 | B2 | 10/2022 | Yamaguchi | |
| 11,650,516 | B2 | 5/2023 | Uesugi | |
| 2016/0154323 | A1 * | 6/2016 | Nishioka | G03G 5/04<br>428/323 |
| 2017/0293238 | A1 | 10/2017 | Kawamura | |
| 2021/0033996 | A1 * | 2/2021 | Kikuchi | G03G 15/0233 |
| 2021/0041796 | A1 * | 2/2021 | Nishioka | G03G 15/0233 |
| 2022/0244658 | A1 | 8/2022 | Yamada | |

* cited by examiner

ELECTROPHOTOGRAPHIC ROLLER, PROCESS CARTRIDGE, AND ELECTROPHOTOGRAPHIC IMAGE FORMING APPARATUS

BACKGROUND OF THE INVENTION

Field of the Invention

The present disclosure relates to an electrophotographic roller, a process cartridge, and an electrophotographic image forming apparatus.

Description of the Related Art

Because of a further enhanced processing speed of electrophotographic image forming apparatuses, consideration has been given to applying a high voltage to a developing blade that is in contact with a developing roller to carry charge onto toner more speedily. Here, one problem when applying a high voltage to a developing blade is charge leakage to a developing roller.

Japanese Patent Application Publication No. 2017-191316 discloses a developing roller that is provided with a surface layer comprising a polyurethane having an oxyalkylene structure and having an oxyalkylene structure having a methyl group as a side chain thereof, and a structure having a polycarbonate moiety between two adjacent urethane bonds.

Japanese Patent Application Publication No. 2017-191316 discloses that the introduction of a specific structure having a polycarbonate structure into the surface layer can lead to an improved resistance of a developing roller, which results in a well suppressed charge leakage from toner to the developing roller.

SUMMARY OF THE INVENTION

The inventors of the present invention considered using a developing roller according to Japanese Patent Application Publication No. 2017-191316 for an electrophotographic image forming apparatus provided with a developing blade to which a higher voltage can be applied. However, in such an electrophotography apparatus, the developing roller according to Japanese Patent Application Publication No. 2017-191316 sometimes causes charge leakage from toner, to which charge has been injected from the developing blade.

Charge leakage from toner to a developing roller decreases the charge quantity of the toner. The decreased charge quantity of the toner may decrease image density, and/or cause the image quality deterioration of toner transfer to an image of a solid white area on paper, which is so-called "fogging". Particularly, an increased processing speed of an electrophotographic image forming apparatus causes fogging or a decrease in image density decrease significantly.

At least one aspect of the present disclosure is directed to provide an electrophotographic roller that allows charge leakage thereto from toner to be surely reduced even in an electrophotographic image forming apparatus where a high voltage is applied to a developing blade. Further, at least one aspect of the present disclosure is directed to provide a process cartridge that can provide high-grade electrophotography images even in an electrophotographic image forming apparatus operable at a fast processing speed. Further, at least one aspect of the present disclosure is directed to provide an electrophotographic image forming apparatus that can provide high-grade electrophotography images even at a fast processing speed.

At least one aspect of the present disclosure is directed to provide an electrophotographic roller comprising:

a substrate comprising a conductive outer surface; and a resin layer on the outer surface of the substrate, wherein the resin layer comprises a polyurethane having a polycarbonate structure, an impedance at a frequency of $1.0\times10^{0}$ to $1.0\times10^{1}$ Hz is $1.00\times10^{6}\Omega$ or more when the outer surface of the electrophotographic roller is directly provided with a metal film, and, under an environment of 23° C. in temperature and 50% in relative humidity and a DC voltage of 50 V is applied between the outer surface of the substrate and the metal film, and an AC voltage of 50 V in amplitude is also applied while a frequency is changed between $1.0\times10^{-1}$ to $1.0\times10^{5}$ Hz, and a maximum value of an electric potential of the outer surface is less than 20.0 V, when the electrical potential being measured under conditions where in an environment of 23° C. in temperature and 50% in relative humidity, a corona discharger having a grid part of 3.0 mm in width is arranged so that a distance between the grid part and the outer surface of the electrophotographic roller is 1.0 mm, and so that a direction of the width of the grid part and an axial direction of the electrophotographic roller are aligned, a voltage of 8 kV is applied to the grid part, the corona discharger is moved in the axial direction of the electrophotographic roller relatively at a speed of 400 mm/sec to charge the outer surface of the electrophotographic roller, and the electric potential of the outer surface 0.06 seconds after a passage of the grid part is measured.

Moreover, at least one aspect of the present disclosure is directed to provide a process cartridge configured to be freely attached to and detached from a main body of an electrophotographic image forming apparatus, wherein the process cartridge is provided with the above electrophotographic roller.

Furthermore, at least one aspect of the present disclosure is directed to provide an electrophotographic image forming apparatus comprising:

a photosensitive member; and a developing roller that supplies a developer to an electrostatic latent image formed on the photosensitive member, wherein the developing roller is the above electrophotographic roller.

According to at least one aspect of the present disclosure, an electrophotographic roller that allows charge leakage thereto from toner to be surely reduced even in an electrophotographic image forming apparatus where a high voltage is applied to a developing blade can be obtained. Further, according to at least one aspect of the present disclosure, a process cartridge that can provide high-grade electrophotography images even in an electrophotographic image forming apparatus with a fast processing speed can be obtained. Further, according to at least one aspect of the present disclosure, an electrophotographic image forming apparatus that can provide high-grade electrophotography images even with a fast processing speed can be obtained.

Further features of the present invention will become apparent from the following description of exemplary embodiments with reference to the attached drawings.

DESCRIPTION OF THE EMBODIMENTS

Figure 1:
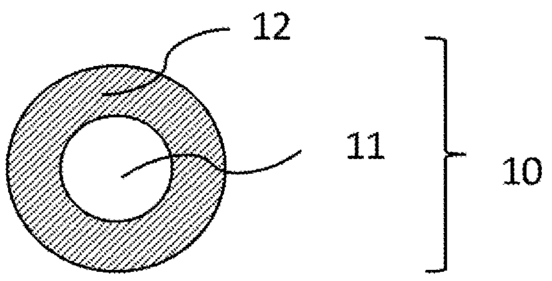
FIG. 1 is a schematic cross-sectional view showing one example of an electrophotographic roller.

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined. In addition, in the present disclosure, for example, descriptions such as "at least one selected from the group consisting of XX, YY and ZZ" mean any of XX, YY, ZZ, the combination of XX and YY, the combination of XX and ZZ, the combination of YY and ZZ, and the combination of XX, YY, and ZZ.

The inventors of the present invention conjectured the reason why a developing roller according to Japanese Patent Application Publication No. 2017-191316 in combination with a developing blade to which a high voltage had been applied could not sufficiently prevent charge from leaking from toner as follows.

In the developing roller according to Japanese Patent Application Publication No. 2017-191316, the specific structure having a polycarbonate structure was introduced into a polyurethane for improving the resistance of the surface layer thereof. In contrast, the specific structure having an oxyalkylene structure was introduced against the increased hardness of the surface layer which was caused by the introduction of the specific structure having a polycarbonate structure.

The inventors of the present invention assumed that this oxyalkylene structure brought the charge leakage from the toner. That is, they considered that the oxyalkylene structure promoted the movement of the charge in the polyurethane. Then, the inventors of the present invention considered the combination of the developing blade to which a high voltage had been applied, and a developing roller that had a surface layer formed using a polyurethane having a polycarbonate structure only (hereinafter may be referred to as a polycarbonate-urethane): the polycarbonate structure was formed by excluding the specific structure including the oxyalkylene structure from the polyurethane of Japanese Patent Application Publication No. 2017-191316.

As a result, the charge leakage from the toner to the developing roller could be prevented, whereas the toner overcharged because of too high an electric resistance of the surface layer was fixed to the surface of the developing roller, which is a new problem.

Accordingly, the inventors of the present invention considered removal of overcharge from the overcharged toner. For example, they considered comprising a conductive filler in the surface layer, and accordingly, found that it is difficult to well disperse a conductive filler in a polycarbonate-urethane having no oxyalkylene structure, which is a new problem. In some cases, insufficient dispersibility of a conductive filler caused the conductive filler to form conduction paths in the surface layer to invite charge leakage, and, in the contrary, caused an insufficient effect of removing overcharge which was expected from the conductive filler.

That is, the inventors of the present invention recognized that it is necessary to develop a new surface layer that allows overcharge to be removed while a high electric resistance of the surface layer is kept for solving the opposing problems of: prevention of charge leakage from toner to a surface layer comprising a polycarbonate-urethane; and removal of overcharge from the overcharged toner at a high level. Based on such recognition, the inventors of the present invention continued further consideration.

As a result, the inventors of the present invention recognized that for solving the aforementioned two opposing problems at a high level, it is effective that an electrophotographic roller comprising a base substrate has a conductive outer surface, and a resin layer that is on the outer surface of the substrate and that comprises a polyurethane having a polycarbonate structure satisfies the following two requirements.

Requirement (1): the outer surface of the electrophotographic roller is directly provided with a metal film, and, under the environment of 23° C. in temperature and 50% in relative humidity, a DC voltage of 50 V is applied between the outer surface of the base and the metal film, and an AC voltage of 50 V in amplitude is also applied while a frequency is changed between $1.0\times10^{-1}$ to $1.0\times10^{5}$ Hz. At this time, the impedance at a frequency of $1.0\times10^{0}$ to $1.0\times10^{1}$ Hz is $1.00\times10^{6}\Omega$ or more.

Requirement (2): under the environment of 23° C. in temperature and 50% in relative humidity, a corona discharger having a grid part of 3.0 mm in width is arranged so that the distance between the grid part and the outer surface of the electrophotographic roller is 1.0 mm, and so that the direction of the width of the grid part and the axial direction of the electrophotographic roller are aligned. A voltage of 8 kV is applied to the grid part, the corona discharger is moved in the axial direction of the electrophotographic roller relatively at a speed of 400 mm/sec to charge the outer surface of the electrophotographic roller, and the electric potential of the outer surface 0.06 seconds after a passage of the grid part is measured. The maximum value of this electric potential at this time is less than 20.0 V.

Hereinafter the requirements (1) and (2) will be described in detail.

Technical Meaning of Requirement (1)

Figure 9:
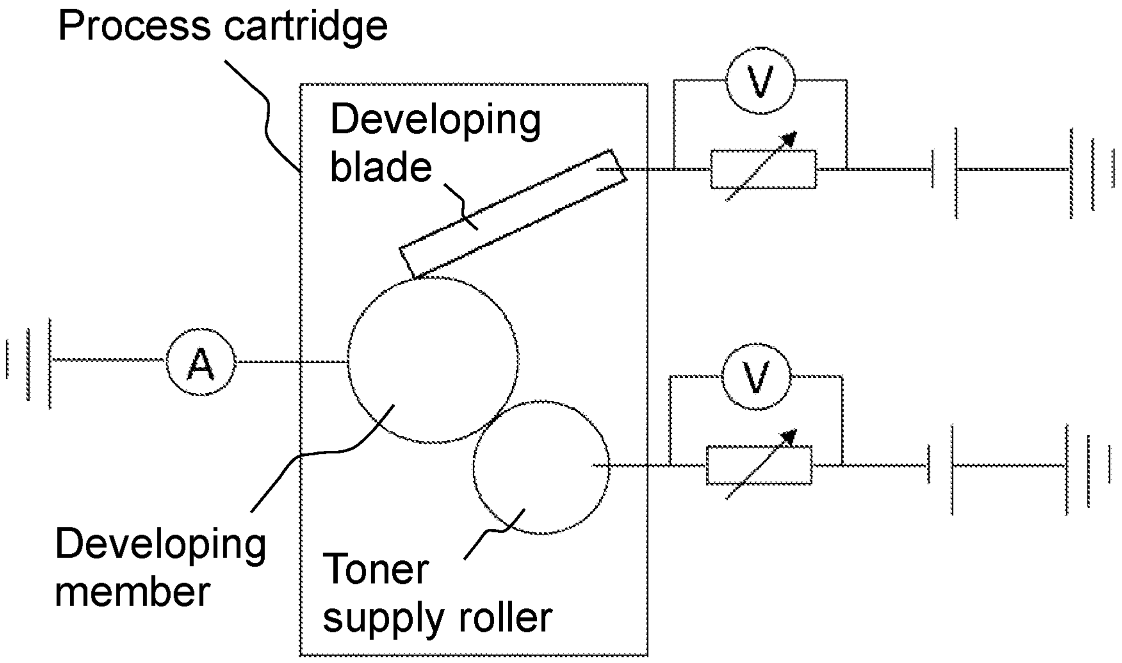
FIG. 9 is a schematic view of a circuit that measured a leakage current flowing from toner to an electrophotographic roller.

In the requirement (1), the numeral value of the impedance of the electrophotographic roller is specified. This impedance is a physical property showing the property of the charge leakage from toner to the electrophotographic roller. According to the circuit diagram shown in FIG. 9, the inventors of the present invention measured the current value (leakage current value) flowing in the electrophotographic roller when a blade bias was applied to the developing blade. As a result, it was found that this current value had a higher correlation with the impedance value of the electrophotographic roller than with the electric resistance value of the electrophotographic roller.

That is, the result showed that against charge leakage, it is necessary to also consider the influence of the capacitance component but not only the resistive component of the electrophotographic roller. This is considered to be because, when the electric characteristics of the electrophotographic roller were shown by a pseudo-RC parallel circuit, a transient state before charge was sufficiently accumulated and the electric characteristics reached the stationary state where the resistive component was dominant largely influenced charge leakage.

The voltage application condition for the impedance measurement was that 50 V of an AC voltage was superimposed on 50 V of a DC voltage. That is, a sinusoidal wave such that the minimum and maximum values of the application voltage were 0 V and 100 V (100 V in Vpp), respectively, was applied. This value of 100 V in Vpp was the value assumed to be the maximum value of a shared voltage applied to the electrophotographic roller when the voltage was applied so that the electric potential difference between the electrophotographic roller and the developing blade was 300 V in the electrophotographic image forming apparatus.

Impedance shows bias dependence, and has a characteristic such that the more the bias increases, the lower the impedance is. It was found that the degree of this lowering changes according to the electrophotographic roller. The voltage application condition that the AC voltage is 1 V is generally used for conventional impedance measurement of an electrophotographic roller. However, the voltage under the application condition that the AC voltage is 1 V is apparently lower than the voltage applied between an electrophotographic roller and a developing blade in an actual electrophotographic image forming apparatus (generally, several hundred volts). Therefore, in most cases, the behavior of the electrophotographic roller in the electrophotographic image forming apparatus cannot be simulated under that condition, and this condition is not proper for the impedance measurement conditions.

Then, in the present disclosure, the voltage application conditions simulating a high blade bias that is applied to an actual electrophotographic image forming apparatus is used. In addition, the sinusoidal wave such that the minimum value of the application voltage is 0 V simulates a rectangular wave generally used in blade bias application in an actual electrophotographic image forming apparatus.

In the present disclosure, the impedance at a frequency of $1.0\times10^0$ to $1.0\times10^1$ Hz is specified. A low frequency range such as a frequency of $1.0\times10^0$ to $1.0\times10^1$ Hz is the domain where the transient state has completed and the electric characteristics reached the stationary state where the resistive component is dominant. In short, the domain where the influence of both the capacitance component and the resistive component is reflected, and which is suitable for understanding the property of the charge leakage from toner to the electrophotographic roller. When the impedance at a frequency of $1.0\times10^0$ to $1.0\times10^1$ Hz is $1.00\times10^6\Omega$ or more, the charge leakage property is low, the charge leakage from toner to the electrophotographic roller is suppressed at a high blade bias, and the decrease of the charge quantity of toner can be prevented. As a result, fogging can be suppressed, and good image density stability can be obtained.

This impedance at a frequency of $1.0\times10^0$ to $1.0\times10^1$ Hz is preferably $1.40\times10^6\Omega$ or more. The larger the value of the impedance is, the more preferable. The upper limit of this impedance is not particularly limited, but for example, is less than $5.00\times10^7\Omega$.

The minimum value of the impedance at a frequency of $1.0\times10^0$ to $1.0\times10^1$ Hz is preferably $1.40\times10^6\Omega$ or more, more preferably $2.00\times10^6\Omega$ or more, particularly preferably $3.00\times10^6\Omega$ or more, and further preferably $5.00\times10^6\Omega$ or more. The preferred range of this impedance is from $1.00\times10^6\Omega$ to $5.00\times10^7\Omega$, preferably from $1.40\times10^6\Omega$ to $5.00\times10^7\Omega$, more preferably from $2.00\times10^6\Omega$ to $5.00\times10^7\Omega$, particularly preferably from $3.00\times10^6\Omega$ to $5.00\times10^7\Omega$, and further preferably from $5.00\times10^6\Omega$ to $5.00\times10^7\Omega$.

Technical Meaning of Requirement (2)

In the requirement (2), the surface electric potential of the electrophotographic roller is specified. The surface electric potential of the electrophotographic roller represents the residual charge on the surface of the electrophotographic roller, and is a physical property showing the degree of overcharge (charge-up) of toner. When the surface electric potential is high, the charge of the overcharged toner cannot be controlled appropriately, which may cause an image density decrease, and/or fogging.

The following two factors are considered to decrease image density. One factor is that the overcharged toner is electrically fixed to the surface of the electrophotographic roller, and a next toner having transferred to the same place cannot be charged. The other factor is that the residual charge is present on the surface of the electrophotographic roller after a toner is removed from the surface of the electrophotographic roller, and a next toner having transferred to the same place cannot be charged.

In the present disclosure, when a voltage of 8 kV is applied to a grid part, and a corona discharger is moved in the axial direction of the electrophotographic roller at a speed of 400 mm/sec relatively, the electric potential of the outer surface 0.06 seconds after the grid part of the corona discharger has passed is measured. If the maximum value of the electric potential of the outer surface is less than 20.0 V, the image defects caused by the overcharge of toner can be suppressed even in an electrophotographic image forming apparatus with a fast processing speed with which it takes a shorter time to transfer the toner charged by the developing blade to a photosensitive member. The time 0.06 seconds after the grid part of the corona discharger has passed simulates the time for a type of the apparatus with a fast processing speed.

The maximum value of the aforementioned electric potential of the outer surface is preferably 15.0 V or less, and more preferably 10.0 V or less. The smaller the maximum value of the electric potential of the outer surface is, the more preferable. The lower limit is not particularly limited.

The preferred range of this maximum value of the electric potential of the outer surface is, for example, preferably 0 V or more and 20.0 V or less, particularly preferably from 0 to 15.0 V, and further preferably from 0 to 10.0 V.

The satisfaction of the requirements (1) and (2) can solve the opposing problems of: prevention of charge leakage from toner to the electrophotographic roller; and removal of overcharge from the overcharged toner at a high level. As a result, fogging can be suppressed, and good image density stability can be obtained.

The means for satisfying the requirements (1) and (2) is not particularly limited. The means will be specifically described later, but an example thereof is a means for making the dispersibility of a conductive filler better using the undermentioned materials of the resin layer and the conductive filler, and additives.

Hereinafter the present disclosure will be described in detail.

Electrophotographic Roller

An electrophotographic roller according to at least one aspect of the present disclosure has a conductive substrate, and at least single resin layer on the outer surface of the substrate.

FIG. 1 shows one example of the electrophotographic roller. An electrophotographic roller 10 shown in FIG. 1 has a resin layer 12 laminated on the outer surface of a cylindrical or hollow cylindrical substrate 11.

Figure 2:
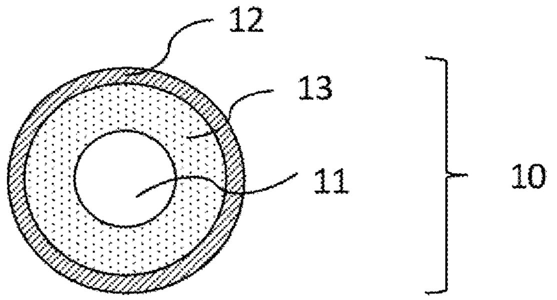
FIG. 2 is a schematic cross-sectional view showing another example of the electrophotographic roller.

The structure of the layer of the electrophotographic roller is not limited to the form shown in FIG. 1. As another form of the electrophotographic roller, an elastic layer 13 may be comprised between the substrate 11, and the resin layer 12 provided on the outer surface of the substrate 11 as shown in FIG. 2.

Substrate

The substrate has a conductive outer surface, and functions as a supporting member of the electrophotographic roller, and in some cases, as an electrode. Preferred specific examples of the substrate include a solid cylindrical substrate and a hollow cylindrical substrate.

A material to constitute the substrate may be appropriately selected to be used from materials known in the field of conductive members for electrophotography, and materials that may be used as the electrophotographic roller. Examples of these materials include metals typified by aluminum and stainless steel, carbon steel alloys, conductive synthetic resins, and metals or alloys such as iron, and copper alloys.

Further, the material to constitute the substrate may be oxidized, or plated with chromium, nickel, or the like. As the type of the plating, either of electroplating and electroless plating may be used. Electroless plating is preferable in view of dimensional stability. Examples of the type of electroless plating as used herein include nickel plating, copper plating, gilding, and plating with any kinds of alloys. The thickness of the plating is preferably at least 0.05 μm, and in view of the balance of working efficiency and a rustproof capacity, preferably 0.1 to 30 μm.

A primer may be applied onto the surface of the substrate for achieving the improvement of the adhesiveness between the substrate and the resin layer. A primer as used herein may be selected to be used from known primers according to the rubber material for forming the conductive layer, the material of the support, etc. Examples of the primer include thermosetting resins and thermoplastic resins, and specific examples thereof include materials such as phenolic resins, polyurethane, acrylic resins, polyester resins, polyether resins, and epoxy resins.

Resin Layer

The electrophotographic roller has the resin layer on the outer surface of the substrate. For example, the resin layer is present on the outer surface of the electrophotographic roller. The resin layer may comprises a binder resin. As the binder resin of the resin layer of the electrophotographic roller, preferably, a polyurethane having a polycarbonate structure is used for suppressing charge leakage from toner to the electrophotographic roller. That is, the resin layer comprises a polyurethane having a polycarbonate structure. Further, more preferably, a polyurethane having the undermentioned structure is used as the binder resin of the resin layer for suppressing charge leakage from toner to the electrophotographic roller, and also sufficiently maintaining a light load on the toner, and wear resistance of the resin layer.

Preferably, the resin layer comprises a polyurethane having a polycarbonate structure, and this polyurethane satisfies at least two of the following (A), (B) and (C). The polyurethane may satisfy all the following (A), (B) and (C).

(A) The polyurethane has a structure represented by the following structural formula (1) in a molecule thereof;

(B) The polyurethane has one or both of a structure represented by the following structural formula (2), and a structure represented by the following structural formula (3) in a molecule thereof;

(C) The polyurethane has a structure represented by the following structural formula 4 in a molecule thereof.

That is, preferably, the polyurethane satisfies at least any one of the following:

At least having a structure represented by the structural formula (1), and a structure represented by the structural formula (2);

At least having a structure represented by the structural formula (1), and a structure represented by the structural formula (3);

At least having a structure represented by the structural formula (1), and a structure represented by the structural formula (4);

At least having a structure represented by the structural formula (2), and a structure represented by the structural formula (4); and At least having a structure represented by the structural formula (3), and a structure represented by the structural formula (4).

Among them, preferably, the polyurethane at least has a structure represented by the structural formula (1), and a structure represented by the structural formula (4) in a molecule thereof in view of better fogging suppression and image density stability.

Structural formula (1)

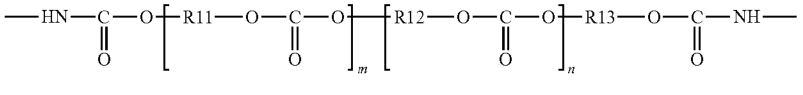

Structural formula (2)

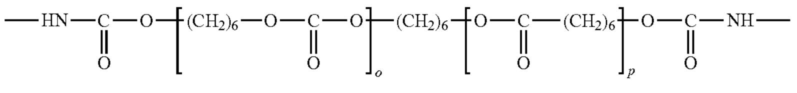

-continued

Structural formula (3)

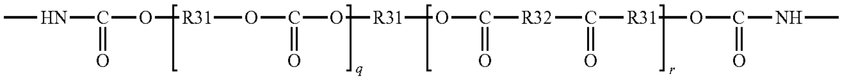

Structural formula (4)

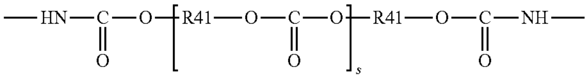

In the structural formula (1), R11, R12 and R13 represent C3-9 divalent hydrocarbon. Here, R11 and R12 are different from each other, and R13 is the same as at least one selected from the group consisting of R11 and R12. m and n are average addition mol numbers, and each independently represent a number of 1.0 or more (preferably 1.0 to 20.0, and more preferably 2.0 to 12.0).

In the structural formula (2), o and p are average addition mol numbers, and each independently represent a number of 1.0 or more (preferably 1.0 to 15.0, and more preferably 4.0 to 10.0).

In the structural formula (3), R31 and R32 each independently represent C3-8 divalent hydrocarbon. q and r are average addition mol numbers, and each independently represent a number of 1.0 or more (preferably 1.0 to 20.0, and more preferably 2.0 to 14.0).

In the structural formula (4), R41 represents C6-9 (preferably C5-8) divalent hydrocarbon. s is an average addition mol number, and represents a number of 1.0 or more (preferably 1.0 to 22.0, and more preferably 4.0 to 18.0).

A structure represented by the structural formula (1) is the structure obtained by reacting, with an isocyanate, a copolymerized polycarbonate polyol such that the crystallinity thereof is suppressed by bonding two carbonate groups by two different hydrocarbon groups. Because the crystallinity is suppressed, the cohesive energy in soft segments is less, and flexibility and a high volume resistivity can be given the resin layer.

The adhesiveness of the resin layer can be lowered by using, for the resin layer, a structure of the structural formula (1) in combination with any of structures of the structural formulae (2) to (4). Therefore, it can be suppressed that toner, powder, etc. adhere to the surface of the resin layer, a rise in electric resistance of the surface of the resin layer due to stains is suppressed, and the toner can be uniformly charged easily.

In the structural formula (1), R11 and R12 are each independently C3-9 divalent hydrocarbon. R11 and R12 are different from each other, and R13 is the same as at least one selected from the group consisting of R11 and R12.

When the carbon number of each of R11 and R12 is 3 or more, the amount of carbonate groups that are polar functional groups and that have more cohesive energy is not too large in the polyurethane having the polycarbonate structure, which makes it easy to keep the resin layer flexible and keep the electric resistance thereof high.

When the carbon number of each of R11 and R12 is 9 or less, the amount of the carbonate group in the polyurethane is not too small, which allows the strength of the polymer to be kept. R11 and R12 have different structures from each other; thereby the crystallinity of the polymer is suppressed, which allows the resin layer to be given flexibility. m and n each independently represent a number of 1.0 or more. The hydrocarbon groups represented by R11, R12 and R13 may each have a branching structure, and may each have a cyclic structure.

Structures represented by the structural formulae (2) and (3) are the structures each obtained by reacting, with an isocyanate, a copolymerized polyol formed by copolymerizing a polycarbonate structure and a polyester structure. The copolymerization of the polycarbonate structure and the polyester structure leads to suppressed crystallinity of the polymer, and the introduction of an ester group that has more cohesive energy than a carbonate group leads to moderately reinforced soft segments. Therefore, wear resistance can be given the resin layer.

When the resin layer is formed using a polymer that is the combination of a structure of the structural formula (1) or (4) with (a) structure(s) represented by the structural formula (2) and/or (3), a sufficient volume resistivity can be given the resin layer, whereas a polar ester group is included, which makes it easier to suppress charge leakage from toner to the electrophotographic roller.

In the structural formula (2), o and p each independently represent a number of 1.0 or more.

In the structural formula (3), R31 and R32 each independently represent C3-8 divalent hydrocarbon, and q and r each independently represent a number of 1.0 or more. When the carbon number of each of R31 and R32 is at least 3, the amount of carbonate groups and ester groups that are polar functional groups and that have more cohesive energy is not too large in the polyurethane, which allows the resin layer to be kept flexible. When the carbon number of each of R31 and R32 is 8 or less, the amount of the carbonate groups and the ester groups in the polyurethane is not too small, which allows the resin layer to be given wear resistance.

A structure represented by the structural formula (4) is the structure obtained by reacting, with an isocyanate, a polycarbonate polyol of high crystallinity which is formed by bonding two carbonate groups by a single hydrocarbon group. This structure has high crystallinity, and is easily arranged in a soft segment; therefore, allows wear resistance and a high volume resistivity to be given the resin layer. The formation of the resin layer by using a polymer that is the combination of a structure represented by the structural formula (4) with any of structures of the structural formulae (1) to (3) causes the hardness of the resin layer not to be too high, which cause appropriate control to be carried out easily.

In the structural formula (4), R41 represents C6-9 divalent hydrocarbon, and s represents a number of 1.0 or more. When the carbon number of R41 is 6 or more, the crystallinity easily develops, and wear resistance and a high volume resistivity can be given the resin layer. When the carbon number of R41 is 9 or less, excessive crystallinity can be suppressed. Therefore, by further comprising at least one of structures represented by the structural formulae (1), (2) and (3) in the polymer, rise in hardness of the resin layer can be suppressed.

The resin layer comprises, as a binder resin, a polymer having a urethane bond, that is, a polyurethane having a polycarbonate structure. Preferably, this polymer satisfies at least two selected from the group consisting of the aforementioned (A), (B) and (C). According to this, the resin layer has flexibility, and shows less wear.

The structure of the polymer comprised in the resin layer of the electrophotographic roller can be confirmed by, for example, analysis using pyrolysis GC/MS, FT-IR, or NMR.

A polyurethane having a polycarbonate structure can be produced using a polyol compound (A), and a polyisocyanate compound (B). Usually, polyurethane is synthesized using a method such as the following (1) and (2):

(1) The one-shot process of mixing and reacting a polyol component and a polyisocyanate component; and (2) The method of reacting an isocyanate group-terminated prepolymer that is obtained by reacting part of a polyol and an isocyanate with a chain extender such as a small molecular diol and a small molecular triol.

In the present disclosure, the polyurethane may be synthesized by either of the aforementioned methods. More preferable is the method of subjecting a hydroxyl group-terminated prepolymer obtained by reacting a raw material polyol and an isocyanate, and an isocyanate group-terminated prepolymer obtained by reacting a raw material polyol and an isocyanate to a heat curing reaction.

Preferably, the polyurethane having the polycarbonate structure is a reaction product of the mixture comprising the hydroxyl group-terminated prepolymer and the isocyanate group-terminated prepolymer. This mixture can be used as a coating liquid for forming the resin layer. More preferably, the polyurethane having the polycarbonate structure is a reaction product of the mixture comprising the hydroxyl group-terminated prepolymer and the isocyanate group-terminated prepolymer, and a conductive filler and an additive.

When there are many hydroxyl groups and isocyanate groups, or urea bonds, allophanate bonds, isocyanurate bonds, etc., many polar functional groups are present in the polyurethane. Therefore, the water absorbency of the polymer increases, and the volume resistivity of the resin layer lowers, which may cause charge leakage from toner to the electrophotographic roller. In contrast, a polyurethane comprising less unreacted polyol and less polar functional groups can be obtained without excessive use of an isocyanate by heat-curing the hydroxyl group-terminated prepolymer and the isocyanate group-terminated prepolymer.

Polyol Compound (A)

A polyol as used herein is selected from known polycarbonate polyols and polyester polycarbonate copolymerized polyols.

Examples of the polycarbonate polyols include polynonamethylene carbonate diol, poly(2-methyl-octamethylene) carbonate diol, polyhexamethylene carbonate diol, polypentamethylene carbonate diol, poly(3-methylpentamethylene) carbonate diol, polytetramethylene carbonate diol, polytrimethylene carbonate diol, poly(1,4-cyclohexanedimethylene carbonate) diol, poly(2-ethyl-2-butyl-trimethylene) carbonate diol, and random/block copolymers thereof.

Examples of the polyester polycarbonate copolymerized polyols include a copolymer obtained by polycondensing a lactone such as &-caprolactone with any of the aforementioned polycarbonate polyols; and a copolymer with a polyester obtained by polycondensing a diol such as 1,4-butanediol, 1,5-pentanediol, 1,6-hexanediol, 3-methylpentanediol, and neopentylglycol, and a dicarboxylic acid such as adipic acid and sebacic acid.

Polyisocyanate Compound (B)

A polyisocyanate as used herein is selected from generally used known polyisocyanates, and examples thereof include toluene diisocyanate (TDI), diphenylmethane diisocyanate (MDI), polymeric diphenylmethane polyisocyanate, hydrogenated MDI, polymeric MDI, xylylene diisocyanate (XDI), hexamethylene diisocyanate (HDI), and isophorone diisocyanate (IPDI). Among them, more preferably used is an aromatic isocyanate such as toluene diisocyanate (TDI), diphenylmethane diisocyanate (MDI), polymeric diphenylmethane polyisocyanate, and polymeric MDI. Any other polyisocyanates can be used as long as not affecting the impedance value and the surface electric potential.

Preferably, the ratio of the number of the isocyanate groups to the number of the hydroxy groups (hereinafter also expressed as the "NCO/OH ratio") is 1.0 to 2.0. When the NCO/OH ratio is 1.0 to 2.0, a crosslinking reaction proceeds to suppress "bleeding" of an unreacted content or a low molecular weight polyurethane. The NCO/OH ratio is more preferably 1.0 to 1.6. When the NCO/OH ratio is 1.0 to 1.6, bleeding is suppressed and the hardness of the polymer can be reduced.

The content of the polyurethane in the resin layer is not particularly limited, but is preferably 50 to 95 mass %, more preferably 60 to 80 mass %, and further preferably 65 to 75 mass %.

Conductive Filler

Preferably, the resin layer comprises a conductive filler for obtaining conductivity. More preferably, an electron conductive agent is used as the conductive filler in the resin layer. Preferably, the electron conductive agent is a conductive particle showing electronic conductivity, and has a surface functional group that can be interactive with a functional group present in the undermentioned additive.

An example of electron conductive agents showing these characteristics is at least one selected from the group consisting of carbon blacks such as furnace black, thermal black, acetylene black, and ketjen black; electroconductive particles based on metal oxides, such as titanium oxide surface-treated with an acidic functional group; and electroconductive particles based on metals, such as aluminum and iron which are surface-treated with an acidic functional group.

Among them, at least one selected from the group consisting of carbon blacks having a surface functional group of high stability is preferably used. Preferably, the conductive filler comprises a carbon black. Further, the following carbon black is particularly preferably used for obtaining a desired impedance value and a desired surface electric potential: the number average diameter of the primary particle is 30 nm or less, the DBP absorption amount is 90 mL/100 g or less, and the pH is 4.0 or less, which allow a higher dispersion in the resin layer to be realized.

When the number average diameter of the primary particle of the carbon black is 30 nm or less, an aggregate that is the minimum unit by which the carbon black can disperse is small, and the structure (the size of a particle chain) is also small. Therefore, conduction paths are difficult to form. Therefore, a sufficiently high impedance is easily obtained. The primary particle diameter of the carbon black can be calculated by transmission electron microscopy (TEM). The smaller this number average diameter is, the more preferable, and the lower limit of this number average diameter is not particularly limited. For example, the number average diameter of the primary particle of the carbon black is 5 to 30 nm, and is more preferably 20 to 28 nm.

When the DBP absorption amount of the carbon black is not more than 90 mL/100 g, the structure of the carbon black is small, and conduction paths are difficult to form. Therefore, a sufficiently high impedance is easily obtained. The smaller this DBP absorption amount is, the more preferable, and the lower limit of this DBP absorption amount is not particularly limited. For example, the DBP absorption amount of the carbon black is 30 to 90 mL/100 g, and more preferably 40 to 60 mL/100 g.

When the pH of the carbon black is 4.0 or less, the effect of dispersion stability is obtained by the repulsion of the surface functional group of the carbon black, and the carbon black is difficult to agglomerate. Therefore, a sufficiently high impedance is easily obtained. The lower the pH of the carbon black is, the more preferable, and the lower limit of this pH is not particularly limited. For example, the pH of the carbon black is 2.0 to 4.0, and more preferably 2.2 to 2.8.

However, in some cases, sufficient dispersion cannot be obtained completely, and a desired impedance cannot be obtained when a polycarbonate-urethane is used as the binder resin although the number average diameter of the primary particle, the DBP absorption amount, and the pH of the carbon black are within the foregoing ranges. The reason why the carbon black having desired raw material physical properties cannot disperse when a polycarbonate-urethane is used as the binder resin is not clearly found. However, the conjecture about this is as follows.

A hydroxyl group that is a surface functional group of the carbon black tends to interact with a hydroxyl group at an end of a polycarbonate diol. In contrast, the structure of bonding a carbonate bond and a hydrocarbon group which is present between two hydroxyl groups of a polycarbonate diol is hydrophobic because of the presence of the hydrocarbon group, and then tends not to interact with the carbon black. The structure is stabler when a hydrophobic group is present close to another hydrophobic group, and a hydrophilic group is present close to another hydrophilic group. Then, a hydrophilic aggregate of the carbon black is present in the vicinity of another hydrophilic aggregate of the carbon black. As a result, the carbon black tends to agglomerate, and is considered to be difficult to disperse.

More preferably, the undermentioned additive is added for sufficiently dispersing the carbon black having a number average diameter of the primary particle, a DBP absorption amount, and a pH within the foregoing numerical ranges when a polycarbonate-urethane is used as the binder resin.

Desirably, the carbon black is added so as to lead to a desired volume resistivity. The content of the carbon black is preferably 30 parts by mass or less to 100 parts by mass of the polyurethane forming the resin layer. This content is more preferably 10 to 30 parts by mass, and further preferably 15 to 25 parts by mass.

When the content of the carbon black is 30 parts by mass or less, an appropriate distance between aggregates of the carbon black in the coating liquid is kept, and the probability of collision of aggregates of the carbon black due to Brownian motion or the like is lowered, which makes the carbon black difficult to agglomerate. Then, the carbon black easily disperses, and the dispersion stability also becomes better. As a result, the carbon black well disperses in the resin layer made by forming the film of the coating liquid.

To achieve the aforementioned specific impedance and surface electric potential, preferably, the dispersion of the carbon black is controlled. For the dispersed particle size of the carbon black, preferably, the arithmetic mean value Rc of the circle-equivalent diameters of the carbon black in the resin layer is 60.0 nm or less. When the standard deviation of the circle-equivalent diameter is defined as $\sigma c$ [nm], more preferably, $\sigma c$/Rc is 0.000 to 0.650.

For the distance between aggregates of the carbon black, more preferably, the arithmetic mean value d of the distances between wall surfaces of the carbon black in the resin layer is 80.0 to 150.0 nm, and when the standard deviation of the distance between the wall surfaces is defined as $\sigma d$ [nm], $\sigma d$/d is 0.000 to 0.600.

The reason why a high impedance and a low surface electric potential are more easily compatible with each other when the above circle-equivalent diameter and distance between wall surfaces are in the aforementioned numerical ranges is conjectured as follows.

When the dispersed particle size is large, there is a portion where the distance between wall surfaces is shorter, which causes conduction paths to be easily formed. Therefore, both the impedance and the surface electric potential become lower. In contrast, when the dispersed particle size is small, the distance between wall surfaces becomes almost uniform, and conduction paths are difficult to form and the resistance becomes higher. Moreover, the capacitance also becomes smaller. Then, the impedance becomes higher. As to the surface electric potential, the resistance becomes higher, and the influence of the capacitance component becomes greater, which allows the surface electric potential to lower by charge in such a quantity that a pseudo capacitor component is capable of accumulating the charge.

Covering the surface of the carbon black with an insulating material such as a silane coupling agent makes the behavior as a pseudo capacitor impossible, which results in a higher impedance and a higher surface electric potential.

A plurality of carbon blacks may be used in combination as long as not affecting the impedance value and the surface electric potential.

The arithmetic mean value Rc of the circle-equivalent diameters is more preferably 40.0 to 60.0 nm, and further preferably 45.0 to 55.0 nm. $\sigma c$/Rc is more preferably 0.500 to 0.650, and further preferably 0.550 to 0.650.

The arithmetic mean value Rc and standard deviation $\sigma c$ of the circle-equivalent diameter can be changed according to, for example, the state of the dispersion in a mill or the like when the coating liquid for forming the resin layer is made. Weaker dispersion tends to cause larger Rc and $\sigma c$, and stronger dispersion tends to cause smaller Rc and $\sigma c$. Since Rc usually converges, $\sigma c$ can be decreased while Rc remains almost constant above a certain dispersion state, and $\sigma c$/Rc can be made smaller.

The arithmetic mean value d of the distances between wall surfaces is more preferably 90.0 to 120.0 nm, and further preferably 95.0 to 115.0 nm. $\sigma d$/d is more preferably 0.500 to 0.600, and is further preferably 0.540 to 0.590.

The arithmetic mean value d and standard deviation $\sigma d$ of the distance between wall surfaces can be changed according to, for example, the state of the dispersion in a mill or the like when the coating liquid for forming the resin layer is made. Weaker dispersion tends to cause smaller d and larger $\sigma d$, and stronger dispersion tends to cause larger d and smaller $\sigma d$. Therefore, weaker dispersion tends to cause larger $\sigma d$/d, and stronger dispersion tends to cause smaller $\sigma d$/d.

Additive

It is also one of preferable aspects to use an additive for much further improving the dispersibility of the carbon black in the binder resin using a polycarbonate-urethane. As an additive as used herein, for example, at least one compound selected from the group consisting of a compound having a structure represented by the following structural formula (5), a compound having a structure represented by the following structural formula (6), and a compound having a structure represented by the following structural formula (7) can be preferably used. One method of comprising the additive in the surface layer is the method of comprising a dispersing agent in the coating liquid for forming the surface layer. In the surface layer formed using the coating liquid for forming the surface layer which comprises at least one compound selected from the group consisting of the compound having a structure represented by the structural formula (5), and the compound having a structure represented by the structural formula (6), this compound may be incorporated in an end of the polymer chain of the polyurethane. Even in such a case, the effect of improving the dispersibility of the carbon black can be expected. However, preferably, it should be present in the surface layer independently from the polyurethane.

Among the compounds having structures represented by the structural formulae (5) to (7), the compound having a structure represented by the structural formula (5) is more preferably used because being particularly excellent in dispersibility of the carbon black, and affinity with a polycarbonate-urethane.

Structural formula (5)

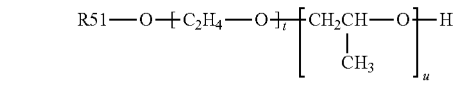

Structural formula (6)

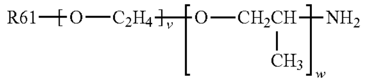

Structural formula (7)

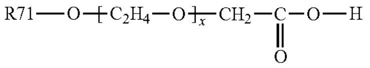

In the structural formula (5), R51 represents C1-12 (preferably C3-12) monovalent hydrocarbon. t and u are average addition mol numbers, and each independently represent a number of 1 or more (preferably 5 to 30, and more preferably 10 to 25).

In the structural formula (6), R61 represents C1-8 (preferably C1-4) monovalent hydrocarbon. v and w are average addition mol numbers, and each independently represent a number of 1 or more (preferably 1 to 30, and more preferably 5 to 30).

In the structural formula (7), R71 represents C1-12 monovalent hydrocarbon. x is an average addition mol number, and represents a number of 1 or more (preferably 1 to 30, and more preferably 4 to 15).

The structural formula (5) is a polyoxyethylene polyoxypropylene alkyl ether, and is a polyether monol having a structure of block addition polymerization of ethylene oxide and propylene oxide. A hydroxyl group at an end of this polyether monol interacts with the surface functional group of the carbon black, which is a conductive filler, by a hydrogen bond, to act as a dispersing agent of the carbon black. The structure of the structural formula (5) is also highly compatible with a polycarbonate-urethane to enhance the effect as a dispersing agent of the carbon black.

Ethylene oxide is introduced in the structure in order for the additive to be uniformly present in the polycarbonate-urethane. This is considered to be because the ethylene group in ethylene oxide is highly compatible with the hydrophobic hydrocarbon group in polycarbonate-urethane. Propylene oxide is introduced in the structure for improving the dispersibility of the conductive filler dispersing in the resin layer. This is considered to be because the interaction of the side chain methyl group of propylene oxide with the conductive filler improves the dispersibility of the conductive filler.

R51, which is C1-12 monovalent hydrocarbon, is introduced in the structure in order for the additive to be uniformly present in the polycarbonate-urethane. The monovalent hydrocarbon group causes high compatibility with the hydrophobic hydrocarbon group in the polycarbonate-urethane, and allows the additive to be uniformly present in the polycarbonate-urethane. The carbon number of 12 or less causes less steric hindrance with the polycarbonate-urethane, and makes it easy for the additive to be present uniformly.

The compound of the formula (5) has a monol structure, thereby, has poorer reactivity than diol, and is difficult to be taken in during the urethane-forming reaction caused by the reaction of an isocyanate and a polyol, which makes it difficult to invite the resistance reduction of the polyurethane caused by the introduction of an ether structure into the polycarbonate-urethane.

The polyoxyethylene polyoxypropylene alkyl ether can be obtained by using a commercially available product, or by synthesis. The polyoxyethylene polyoxypropylene alkyl ether can be synthesized by performing the step (B) after the step (A) as follows. The step (B) may be performed on a commercially available product having a structure on which the step (A) has been completed.

Step (A): Reaction of an Alcohol and Ethylene Oxide

Step (B): Reaction of the Product Obtained by the Step (A), and Propylene Oxide

In the step (A), the reaction can proceed by adding ethylene oxide to an alcohol at 50 to 200° C., more preferably at 100 to 160° C. in the presence of a catalyst. The boiling point of ethylene oxide is 10.7° C. Therefore, ethylene oxide is a gas at the foregoing temperatures. Therefore, preferably, the reaction is carried out under the environment where pressure is applied in a sealed container. The pressure is preferably 0.1 to 1.0 MPa. The reaction time is not particularly limited, but is preferably approximately 1 to 3 hours for reducing an unreacted content of ethylene oxide.

As the catalyst, an acid catalyst or an alkaline catalyst may be used, but an alkaline catalyst is preferable for facilitating purification after the completion of the reaction. Examples of an alkaline catalyst as used herein include: alkali metal hydroxides such as sodium hydroxide and potassium hydroxide; alkaline earth metal hydroxides such as calcium hydroxide and barium hydroxide; ammonium hydroxide; and tertiary amines. Sodium hydroxide and potassium hydroxide are particularly preferable in view of easiness and efficiency of the reaction. Examples of an acid catalyst as used herein include Brønsted acids such as sulfuric acid and phosphoric acid, and Lewis acids such as stannic chloride and boron trifluoride.

The use amount of the catalyst when the catalyst is sodium hydroxide or potassium hydroxide is preferably 0.1 to 5 mol % to 1 mol of an alcohol. The reaction of ethylene oxide with water generates ethylene glycol. Therefore, care must be taken to reduce a moisture content as much as possible. Dehydration may be performed before the reaction of the step (A) if necessary.

The step (B) can be performed under the same conditions as in the step (A). The boiling point of propylene oxide is 34.2° C. Then, propylene oxide is a gas at the reaction temperature of 50 to 200° C. Therefore, preferably, the reaction is carried out under the environment where pressure is applied in a sealed container. For the catalyst, the catalyst used in the step (A) may be used as it is, or a catalyst may be newly added. Preferably, the catalyst used in the step (A) is newly added.

The structural formula (6) is a polyetheramine (monoamine) having a structure of block addition polymerization of ethylene oxide and propylene oxide. An amino group at an end of this polyetheramine interacts with the surface functional group of the carbon black, which is a conductive filler, by a hydrogen bond, to act as a dispersing agent of the carbon black. For enhancing the effect as a dispersing agent, the introduction of R61, which is C1-8 monovalent hydrocarbon, leads to the structure easily showing an affinity with the hydrophobic functional group of the polycarbonate-urethane, and also highly compatible with the polycarbonate-urethane.

The polyether monoamine can be obtained by using a commercially available product, or by synthesis. The polyether monoamine can be synthesized by performing the step (D) after the step (C) as follows.

Step (C): Oxidation Reaction of the Compound of the Structural Formula 5 which is a Secondary Alcohol Step (D): Reductive Amination Reaction of the Product Obtained by the Step (C)

The step (C) is the reaction of generating a ketone by the oxidation reaction of a secondary alcohol. In the synthesis of a ketone by the oxidation of a secondary alcohol, the oxidation reaction using a heavy metal salt such as chromic acid and manganese dioxide, and derivatives thereof, or the oxidation reaction of a non-heavy metal salt using dimethylsulfoxide (DMSO), or a hypohalogenite such as hypochlorous acid is used.

The synthesis may be performed using either of the reactions. In view of the environmental impact of heavy metals, the oxidation reaction using dimethylsulfoxide (DMSO), or a hypohalogenite such as hypochlorous acid is preferable. Further, the reaction with dimethylsulfoxide (DMSO) explosively proceeds at room temperature according to a used electrophilic activating reagent, and therefore, low temperature of −60° C. is necessary. Therefore, the method using a hypohalogenite is more preferable. Examples of a hypohalogenite as used herein include hypochlorites such as sodium hypochlorite and calcium hypochlorite (bleaching powder). A ketone is obtained by reacting such a hypochlorite with a secondary alcohol in acetic acid.

When dimethylsulfoxide (DMSO) is used, an electrophilic activating reagent is also necessary other than this. An electrophilic activating reagent improves the electrophilicity of sulfur in dimethylsulfoxide (DMSO), and thereby, dimethylsulfoxide (DMSO) is subjected to a nucleophilic attack by an alcohol hydroxyl group. This nucleophilic attack leads to the formation of a dimethyl alkoxysulfonium salt. This dimethyl alkoxysulfonium salt decomposes, and then, a ketone and dimethyl sulfide are obtained. Examples of an electrophilic activating reagent as used herein include dicyclohexylcarbodiimide (DCC), acetic anhydride, phosphorus pentoxide, pyridine sulfur trioxide complex, trifluoroacetic anhydride, oxalyl chloride, and halogens.

The step (D) is the reductive amination reaction of converting the ketone into an amine. This reaction includes separate two stages. First, a carbonyl group and an amine react with each other to generate an iminium cation. Next, the iminium cation is subjected to a nucleophilic attack of a hydride reducing agent to generate an amine. As the reducing agent, a borohydride reagent is preferably used. Examples of a borohydride reagent as used herein include sodium cyanoborohydride, sodium triacetoxyborohydride, and 2-picoline borane. Among them, sodium triacetoxyborohydride, and 2-picoline borane that have low toxicity are preferable. In the reductive amination reaction by the use of a borohydride reagent, a bulky structure causes difficulty in the formation of the iminium cation due to steric hindrance. Therefore, R61 in the structural formula (6) is preferably C1-8 monovalent hydrocarbon.

The structural formula (7) is a polyoxyethylene alkyl ether acetic acid. Carboxylic acid at an end of the structural formula (7) interacts with the surface functional group of the carbon black, which is a conductive filler, by a hydrogen bond, to act as a dispersing agent of the carbon black. For enhancing the effect as a dispersing agent, the introduction of R71, which is C1-12 monovalent hydrocarbon, leads to the structure easily showing an affinity with the hydrophobic functional group of the polycarbonate-urethane, and also highly compatible with the polycarbonate-urethane.

The polyoxyethylene alkyl ether acetic acid can be obtained by using a commercially available product, or by synthesis. The polyoxyethylene alkyl ether acetic acid can be synthesized by performing the step (F) after the step (E) as follows. The step (F) may be performed on a commercially available product having a structure on which the step (E) has been completed.

Step (E): Reaction of an Alcohol and Ethylene Oxide

Step (F): Oxidation Reaction of a Primary Alcohol that is the Product by the Step (E)

The step (E) is the same as the step (A). In the step (E), production can be performed in the same manner as in the step (A).

The step (F) is the step of oxidizing a primary alcohol to generate carboxylic acid. In the oxidation of a primary alcohol, an aldehyde is generated, and thereafter carboxylic acid is generated by further oxidation. Then, it is necessary to select a reaction process and reaction conditions that do not stop the reaction at the stage where an aldehyde is generated. Examples of the process of obtaining carboxylic acid by the oxidation of a primary alcohol include oxidation by an oxidizing agent, and a catalytic dehydrogenation reaction by a catalyst. Examples of an oxidizing agent as used herein include permanganates, chromic acid, ruthenium tetroxide, and hypochlorites. Examples of a catalyst for the dehydrogenation reaction includes palladium, platinum, iridium, rhodium, and manganese.

The compounds represented by the structural formulae (5) to (7) each have the function as a dispersing agent of the carbon black, and show a high affinity with the polycarbonate-urethane. Generally, a surfactant is used as a measure to improve dispersibility and dispersion stability of carbon black. However, the compounds represented by the structural formulae (5) to (7) each have a small number of the functional groups to act on a surface functional group of carbon black, and therefore, weak effect of surface activity, and are not generally used. As general dispersing agents for carbon black, coupling agents, and non-ionic surfactants are practically used.

As coupling agents used as general dispersing agents for carbon black, silane coupling agents, titanate-based coupling agents, and aluminum-based coupling agents are used. As non-ionic surfactants used as general dispersing agents for carbon black, polyester-based or polyether-based non-ionic surfactants are used. However, when any of these dispersing agents are added to such an extent that the dispersibility of the carbon black can be sufficiently improved in the polycarbonate-urethane (50% to 100% to the carbon black in mass ratio), the conductivity of the carbon black and the binder resin are inhibited. On the contrary, when the adding amount of this dispersing agent is such an extent that the conductivity of the carbon black and the binder resin are not inhibited (10% to 40% to the carbon black in mass ratio), the dispersibility of the carbon black cannot be obtained.

The adding amount of the compounds represented by the structural formulae (5) to (7) is preferably 3.0 to 7.0 mass %, and more preferably 3.0 to 5.0 mass % on the basis of the solid content of the coating for forming the surface layer; and the total content thereof is preferably 18.9 to 46.0 parts by mass to 100 parts by mass of the carbon black in the coating for forming the surface layer.

The content of the additive in the coating for forming the surface layer is within the above range; thereby, the dispersibility of the carbon black in the polyurethane is much further improved, and desired impedance value and surface electric potential can be more easily achieved.

The confirmation whether the additive is present in the resin layer, and quantitative evaluation of the additive can be analyzed by the following process. The resin layer of the electrophotographic roller is cut out; and by using, for example, $^{1}$H-NMR, $^{13}$C-NMR, XPS, and FT-IR for a slice thereof, the carbonate structure of the binder resin, and the ether structure, the amine structure and the carboxylic acid structure of the additive can be detected in the resin layer, and the proportions thereof can be calculated by the ratio of the peaks etc.

Alternatively, the slice is immersed in an organic solvent such as 2-butanone (methyl ethyl ketone; MEK) overnight, and then, is subjected to extraction; by using $^{1}$H-NMR, $^{13}$C-NMR, XPS, and FT-IR for the extract and the slice after the extraction, the proportions of the additive incorporated into the polymerization reaction of the resin, and not incorporated thereinto can be calculated.

Examples of the structure of bonding at least one of the compounds having structures represented by the structural formulae (5) and (6) to the polyurethane (the structure reacted in the polymerization of the polyurethane) include the following forms:

In the case of the structure represented by the structural formula (5), the structure such that the compound having a structure represented by the structural formula (5) forms a urethane in the polyurethane; and In the case of the structure represented by the structural formula (6), the structure such that the compound having a structure represented by the structural formula (6) forms a urea in the polyurethane.

Roughening Particle

The resin layer may comprise a roughening particle. The roughening particle may be, for example, a spherical particle. The particle diameter of the roughening particle is, for example, preferably in the range of 1 to 150 μm, and more preferably in the range of 5 to 30 μm. An example of the roughening particle is at least one spherical particle selected from the following particles:

Urethane resin particle, acrylic resin particle, phenolic resin particle, silicone resin particle, polyacrylonitrile resin particle, polystyrene resin particle, polyurethane resin particle, nylon resin particle, polyethylene resin particle, and polypropylene resin particle; and preferably urethane resin particle.

The content of the roughening particle is preferably 1 to 20 mass %, and more preferably 5 to 15 mass % in the resin layer.

The electrophotographic roller may have an elastic layer over the outer surface of the substrate. For example, the electrophotographic roller has the elastic layer between the substrate and the resin layer. The elastic layer is not particularly limited, but a known one may be used as the elastic layer of the electrophotographic roller. An example of a known elastic layer as used herein is a cured material of an addition cure liquid silicone rubber mixture.

Production Method

The method of forming the resin layer is not particularly limited. Examples of the method include the methods by spraying using a coating, dip coating, and roll coating. For example, the resin layer can be formed by applying a coating liquid for forming the resin layer onto the substrate or the elastic layer formed over the outer surface of the substrate by a known method, and heat-drying the resultant. The heat-drying conditions are not particularly limited. An example is the method of drying under the condition of 120 to 200° C. The thickness of the resin layer is not particularly limited, either, but is preferably 1 to 50 μm, and more preferably 5 to 20 μm.

Process Cartridge and Electrophotographic Image Forming Apparatus

Figure 3:
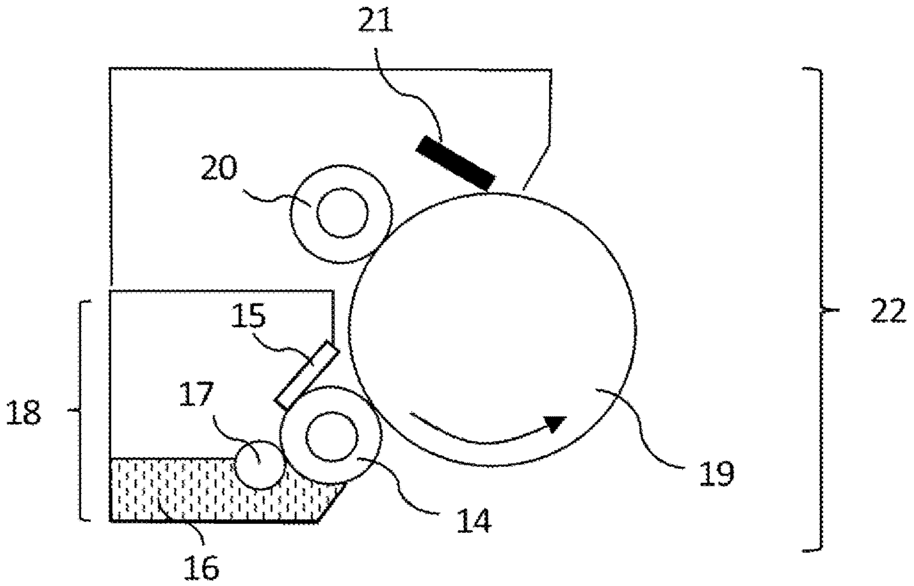
FIG. 3 is a schematic view of a process cartridge.

The electrophotographic roller according to the present disclosure can be preferably used as a developing roller, a toner supply roller, and a developing sleeve in a process cartridge. FIG. 3 is a schematic cross-sectional view of one example of a process cartridge according to one aspect of the present disclosure. In FIG. 3, the electrophotographic roller is installed as a developing roller 14. A process cartridge 22 is configured to be attachable to and detachable from the main body of the electrophotographic image forming apparatus. The process cartridge 22 is formed by uniting a developing apparatus 18 provided with the developing roller 14 and a developing blade 15, a photosensitive member 19, a charging roller 20, and a cleaning blade 21. Further, the developing apparatus 18 is filled with a toner 16. The toner 16 is supplied to the surface of the developing roller 14 by the toner supply roller 17, and the layer of the toner 16 having a predetermined thickness is formed over the surface of the developing roller 14 by the developing blade 15.

The developing roller 14 is in contact with the photosensitive member 19, and is rotationally driven with respect to the photosensitive member 19 at a predetermined peripheral velocity ratio. A predetermined bias is applied to the developing roller 14, and an electrostatic latent image on the photosensitive member 19 is developed and visualized using the toner 16.

The toner supply roller 17 is in contact with the developing roller 14, penetrates at a predetermined penetration level to rotate in the same direction as the rotation direction of the developing roller 14. A bias of the same electric potential as the bias applied to the developing roller 14 is applied to the toner supply roller 17.

One end of the developing blade 15 is fixed to the developing apparatus 18, and the other end thereof, which is a free end, is arranged to be in contact with the developing roller 14 in the direction opposite to the rotation direction of the developing roller 14. The arrangement of the developing blade 15 to be in contact with the developing roller 14 leads to the regulated toner amount on the developing roller 14, and a thinned toner layer, to form the toner layer of a uniform thickness. A predetermined bias is applied to the developing blade 15 to charge the toner 16.

Figure 4:
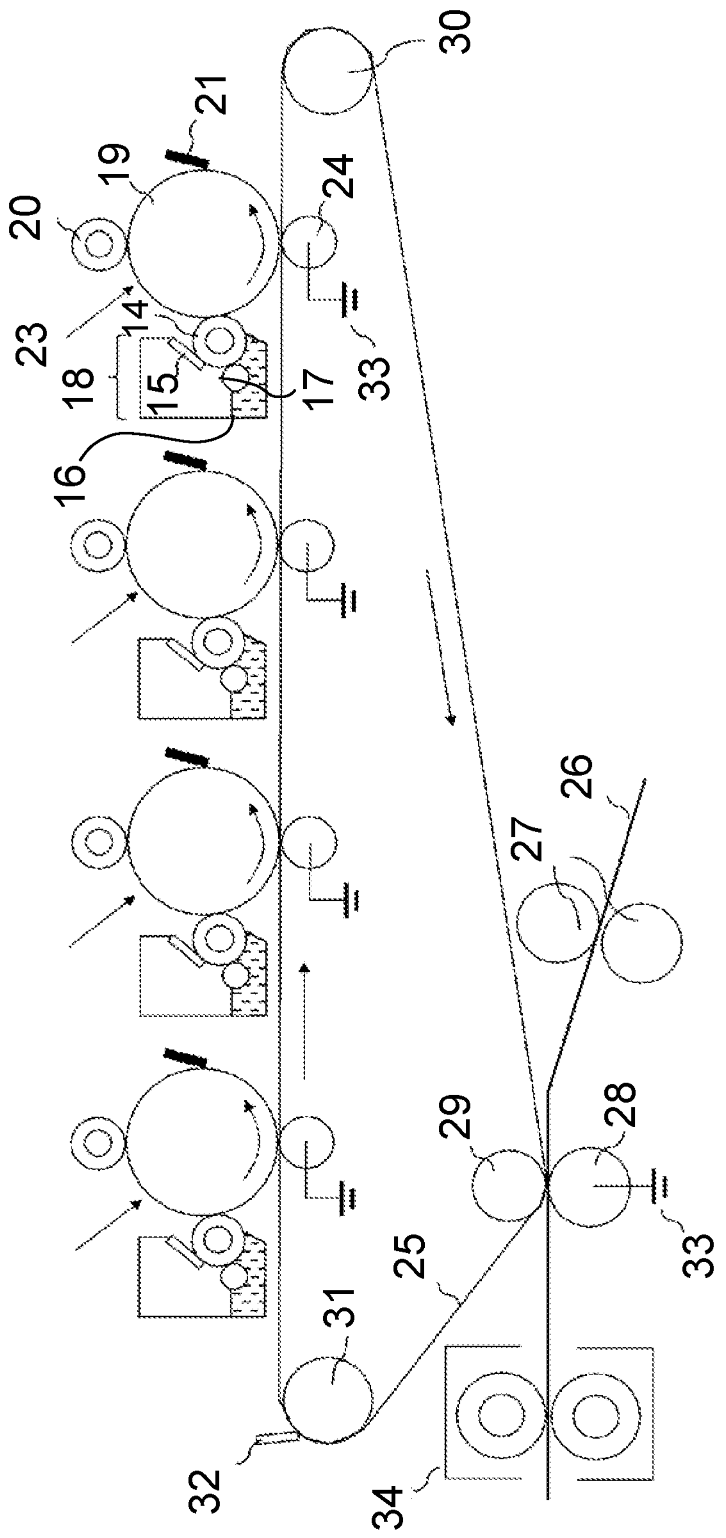
FIG. 4 is a schematic view of an electrophotographic image forming apparatus.

FIG. 4 is a schematic cross-sectional view showing one example of the electrophotographic image forming apparatus into which the electrophotographic rollers are installed as developing rollers for a contact-type developing apparatus using a one-component toner. Each of the developing apparatuses 18 comprises the toner 16 as a one-component toner, the developing roller 14, the toner supply roller 17 to supply the toner to the developing roller 14, and the developing blade 15 to regulate the thickness of the toner layer over the developing roller 14. The developing roller 14 is positioned at an opening part that is present as extending in the longitudinal direction in the developing apparatus 18, and is placed to be in contact with the photosensitive member 19. The main body of the electrophotographic image forming apparatus may be equipped with the photosensitive member 19, the charging roller 20, and the cleaning blade 21. The colored toners of black, cyan, magenta, and yellow are prepared in the developing apparatuses 18, respectively, which enables color printing.

Hereinafter the printing operation of the electrophotographic image forming apparatus will be described. Each of the photosensitive members 19 rotates in the direction indicated by the arrow, and is uniformly charged by the charging roller 20 for charging the photosensitive member 19. Next, an electrostatic latent image is formed on the surface of the photosensitive member 19 by a laser light 23 that is an exposure measure. The toner 16 is applied to the electrostatic latent image by the developing apparatus 18 from the developing roller 14 arranged to be in contact with the photosensitive member 19; thereby, the electrostatic latent image is visualized (developed) as a toner image. This development is so-called reversal development such that a toner image is formed on an exposure part.

The toner image formed on the photosensitive members 19 is transferred onto an endless belt-shaped intermediate transfer member 25 by transfer rollers 24 that are transfer members.

Paper 26 that is a recording medium is fed into the apparatus by sheet-feeding rollers 27 and a secondary transfer roller 28, and is conveyed to a nip portion between the secondary transfer roller 28 and a driven roller 29 together with the intermediate transfer member 25 having the toner image, and the toner image is transferred on the paper 26. The intermediate transfer member 25 is operated by the driven roller 29, a driver roller 30, and a tension roller 31. The toner remaining on the intermediate transfer member 25 is cleaned by a cleaning device 32.

A voltage is applied from bias power sources 33 to the developing rollers 14, the developing blades 15, the transfer rollers 24, and the secondary transfer roller 28. The paper 26 onto which the toner image is transferred is subjected to a fixing treatment by a fixing apparatus 34, and discharged to the outside of the apparatus, and the printing operation is completed. Meanwhile, transfer residual toners remaining on the photosensitive members 19 without being transferred are scraped off by the cleaning blades 21 that are cleaning members for cleaning the surfaces of the photosensitive members. The cleaned photosensitive members 19 repeatedly perform the foregoing printing operation.

Impedance

In the measurement of the impedance, the response of the electrophotographic roller when an AC voltage and a DC voltage are applied while the frequency is being changed is checked. An AC voltage is applied, and the following two responses to the applied AC voltage are separately measured: the response including no phase shift; and the response including a phase shift of $\pi/2$. The impedance of the response including no phase shift is defined as Z' (real part), and the impedance of the response including the phase shift is defined as Z" (imaginary part), and they are plotted on a complex plane. The distance from the origin to the plotted point is calculated as the impedance value.

When the electric characteristics of the electrophotographic roller are shown as a pseudo-RC parallel circuit, the real part having no phase shift is shown as a resistive component, and the imaginary part having the phase shift is shown as a capacitance component. The measurement conditions and the meanings of the measured values have been described in Technical Meaning of Requirement (1) above, and therefore, the description thereof is omitted in this section.

The measurement method, the measuring apparatus, and the measurement conditions of the impedance will be described below.

Measurement Method of Impedance

The impedance of the electrophotographic roller can be measured by either of the following methods (1) and (2):

(1) The method of providing a film electrode on the surface of the electrophotographic roller, and measuring the impedance by the use of the two terminals of the electrode and the substrate; and (2) The method of pushing the electrophotographic roller against a metal drum at a certain load, and measuring the impedance by the use of the two terminals of the metal drum and the substrate.

The impedance can be measured by either of the methods. In the method (2), the nip width and the contact area between the electrophotographic roller and the metal drum affect the measurement, and therefore, it is necessary to perform the measurement by the use of an electrophotographic roller of an equivalent hardness. Therefore, in the present disclosure, the measurement is performed by the method (1). The measurement method (1) will be described below. More specific conditions will be described later.

When the impedance is measured, for removing the influence of the contact area between the electrophotographic roller and the measuring electrode, preferably, a thin film of a low resistance is piled on the surface of the electrophotographic roller and is used as an electrode, whereas the conductive substrate is used as a ground electrode, and the impedance is measured using these two terminals.

Examples of the method of forming that thin film include metal film formation methods such as metal vapor deposition, sputtering, application of a metal paste, and adhering a metal tape. Among them, the method of forming a thin film of a metal such as platinum and palladium as an electrode by vapor deposition is preferable in view of reducing the contact resistance with the electrophotographic roller. In the present disclosure, vacuum platinum deposition is used.

When a metal thin film is formed on the surface of the electrophotographic roller, in view of simplicity and uniformity of the thin film, preferably used is a vacuum vapor deposition device provided with a mechanism capable of gripping an electrophotographic roller, and when the electrophotographic roller has a cylindrical cross section, further provided with a rotation mechanism.

Preferably, a metal film electrode having a width of approximately 10 mm is formed on the electrophotographic roller in the longitudinal direction thereof, and a metal sheet wound around the metal film electrode in a direction crossing the longitudinal direction of the electrophotographic roller without a gap is connected to a measuring electrode led from the measuring apparatus. When the electrophotographic roller has a cylindrical shape, preferably, a metal sheet wound around the electrophotographic roller in a circumferential direction without a gap is used. This allows the impedance to be measured without any influence of fluctuations in the size of the outer edges in a cross section of the electrophotographic roller which is orthogonal to the longitudinal direction thereof (outer diameter when the electrophotographic roller has a cylindrical shape), and the surface profile thereof. As the metal sheet, an aluminum foil, a metal tape, or the like may be used.

Measurement Conditions for Impedance

The impedance measuring apparatus is not limited as long as the impedance in the frequency range of $1.0\times10^{-1}$ to $1.0\times10^{5}$ Hz can be measured, such as an impedance analyzer, a network analyzer, and a spectrum analyzer. Among them, preferably, the measurement is performed with an impedance analyzer in view of the electric resistance range of the electrophotographic roller.

The impedance measurement conditions will be described. The impedance in the frequency domain of $1.0\times10^{-1}$ to $1.0\times10^{5}$ Hz is measured using the impedance measuring apparatus. The measurement environment is 23° C. in temperature, and 50% in relative humidity. For taking the measurement variations into consideration, preferably, the measurement is performed at least at nine points in total; that is, three points in the rotational direction of the electrophotographic roller for three points in the longitudinal direction thereof. The voltage application condition is that 50 V of an AC voltage is superimposed on 50 V of a DC voltage.

Surface Electric Potential

Under the environment of 23° C. in temperature and 50% relative humidity, a corona discharger having a grid part of 3.0 mm in width is arranged so that the distance between the grid part and the outer surface of the electrophotographic roller is 1.0 mm, and that the direction of the width of the grid part is the same as the axial direction of the electrophotographic roller. A voltage of 8 kV is applied to the grid part, and the corona discharger is moved in the axial direction of the electrophotographic roller relatively at a speed of 400 mm/sec to charge the outer surface of the electrophotographic roller. The electric potential of the outer surface 0.06 seconds after the grid part has passed is measured, and thereby, the degree of overcharge (charge-up) of the toner is evaluated.

Figure 8:
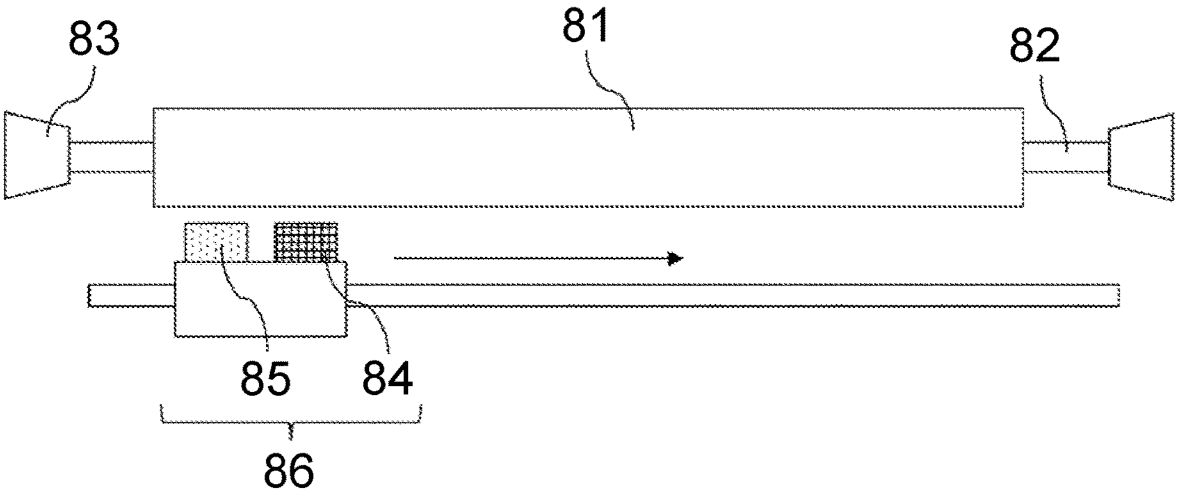
FIG. 8 is a schematic view showing one example of a device that measures the surface electric potential of the electrophotographic roller.

The surface electric potential of the electrophotographic roller can be measured by, for example, a device shown in FIG. 8. Both the ends of a substrate 82 of an electrophotographic roller 81 are held by chucks 83, and a measurement unit 86 such that a corona discharger 84 and a surface electrometer 85 are arranged in parallel at an interval of 25 mm is arranged oppositely to the surface of the electrophotographic roller 81 at an interval of 1.0 mm. As the electrophotographic roller 81 is kept standing still, a voltage of 8 kV is applied to the grid part of the corona discharger 84, and the measurement unit 86 is moved in the axial direction of the electrophotographic roller 81 at a velocity of 400 mm/sec. The surface electric potential 0.06 seconds after the corona discharger 84 has passed is measured by the surface electrometer 85.

The measurement conditions and the meanings of the measured values have been described in Technical Meaning of Requirement (2) above, and then, the description thereof is omitted in this section.

EXAMPLES

The present invention will be described in more detail hereinbelow with reference to Examples, but the present invention is not limited thereto.

1. Preparation and Production of Raw Materials for Forming Resin Layer

1-1. Preparation and Production Examples of Raw Material Polyols

Hereinafter synthesis examples for obtaining a polyurethane resin layer will be shown.

Measurement of Number Average Molecular Weight of Raw Material Polyols

The apparatus and conditions used for the measurement of the number average molecular weights (Mn) in these production examples were as follows:

Measuring apparatus: HLC-8120GPC (manufactured by Tosoh Corporation);
Column: two columns of TSKgel SuperHZMM (manufactured by Tosoh Corporation);
Solvent: tetrahydrofuran (THF) (20 mmol/L triethylamine added);
Temperature: 40° C.; and
Flow rate of THF: 0.6 mL/min.

A 0.1 mass % THE solution was used as a measurement sample. Further, the measurement was carried out using a RI (refractive index) detector as a detector.

Calibration curves were created using TSK standard polystyrene A-1000, A-2500, A-5000, F-1, F-2, F-4, F-10, F-20, F-40, F-80 and F-128 manufactured by Tosoh Corporation as standard samples for making calibration curves. The number average molecular weights were calculated from the obtained retention time of the measurement samples based on these calibration curves.

Preparation of Raw Material Polyols

A-1 to A-16 shown in Table 1 below, which were 16 raw material polyols, were purchased commercially available products. The raw material polyols A-17 and A-18 were synthesized.

TABLE 1

| No. | Raw material polyol |
|---|---|
| A-1 | DURANOL T5652 Mn = 2000 (Manufactured by Asahi-Kasei Chemicals Corporation) |
| A-2 | DURANOL G4672 Mn = 2000 (Manufactured by Asahi-Kasei Chemicals Corporation) |
| A-3 | DURANOL G3452 Mn = 2000 (Manufactured by Asahi-Kasei Chemicals Corporation) |
| A-4 | DURANOL G4692 Mn = 2000 (Manufactured by Asahi-Kasei Chemicals Corporation) |
| A-5 | KURARAY POLYOL C2050 Mn = 2000 (Manufactured by Kuraray Co., Ltd.) |
| A-6 | KURARAY POLYOL C2090 Mn = 2000 (Manufactured by Kuraray Co., Ltd.) |
| A-7 | KURARAY POLYOL C3090 Mn = 3000 (Manufactured by Kuraray Co., Ltd.) |
| A-8 | KURARAY POLYOL C2015N Mn = 2000 (Manufactured by Kuraray Co., Ltd.) |
| A-9 | KURARAY POLYOL C2060N Mn = 2000 (Manufactured by Kuraray Co., Ltd.) |
| A-10 | Nippollan 982 Mn = 2000 (Manufactured by Tosoh Corporation) |
| A-11 | ETERNACOLL UH-200 Mn = 2000 (Manufactured by Ube Industries, Ltd.) |
| A-12 | ETERNACOLL UH-300 Mn = 3000 (Manufactured by Ube Industries, Ltd.) |
| A-13 | ETERNACOLL UC-100 Mn = 2000 (Manufactured by Ube Industries, Ltd.) |
| A-14 | ETERNACOLL UM-90(1:1) Mn = 900 (Manufactured by Ube Industries, Ltd.) |
| A-15 | ETERNACOLL UM-90(1:3) Mn = 900 (Manufactured by Ube Industries, Ltd.) |
| A-16 | Oxymer M112 Mn = 1000 (Manufactured by Perstorp Japan Co., Ltd.) |

Synthesis of Raw Material Polyol A-17

In a nitrogen atmosphere, 100.0 g of 1,3-propanediol, 49.4 g of adipic acid, and 69.5 g of ethylene carbonate were mixed and heated, and while the temperature was increased to 200° C., generated ethylene glycol and water were evaporated off from the reaction system. After ethylene glycol and water were evaporated off, 15 ppm of titanium tetraisopropoxide was added, and a polycondensation reaction was allowed to proceed in a reduced pressure of 266.7 Pa. The reaction liquid was cooled to room temperature, and the raw material polyol A-17 was obtained. The obtained raw material polyol A-17 had a number average molecular weight of 2030.

Synthesis of Raw Material Polyol A-18

The raw material polyol A-18 was produced by the same method as in the case of the raw material polyol A-17 except that the starting raw materials shown in Table 2 below were used. The raw material polyol A-18 had a number average molecular weight of 2040.

TABLE 2

| Raw material polyol No. | Diol (Parts by mass) | Dicarboxylic acid (Parts by mass) | Ethylene carbonate (Parts by mass) | Ester group/ carbonate group (Molar ratio) | Number average molecular weight |
|---|---|---|---|---|---|
| A-17 | 1,3-propanediol (100.0) | Adipic acid (49.4) | 69.5 | 3/7 | 2030 |
| A-18 | 1,6-hexanediol (100.0) | Sebacic acid (102.8) | 19.2 | 7/3 | 2040 |

1-2. Preparation of Raw Material Isocyanates B-1 to B-6

The raw material isocyanates shown in Table 3 below were prepared.

TABLE 3

| No. | Raw material isocyanate |
|---|---|
| B-1 | Diphenylmethane diisocyanate (MDI) (Trade name: MILLIONATE MT, Manufactured by Tosoh Corporation) |
| B-2 | Polymethylene polyphenyl polyisocyanate (Polymeric MDI) (Trade name: MILLIONATE MR200, Manufactured by Tosoh Corporation) |
| B-3 | Tolylene diisocyanate (TDI) (Trade name: Coronate T-80, Manufactured by Tosoh Corporation) |
| B-4 | Adduct of tolylene diisocyanate (TDI) and trimethylolpropane (Trade name: Coronate L, Manufactured by Tosoh Corporation) |
| B-5 | Hexamethylene diisocyanate (Trade name: DURANATE 50M-HDI, Manufactured by Asahi-Kasei Chemicals Corporation) |
| B-6 | Isocyanurate trimer of hexamethylene diisocyanate (Trade name: DURANATE TPA-100, Manufactured by Asahi-Kasei Chemicals Corporation) |

1-3. Production Examples of Hydroxy Group-Terminated Urethane Prepolymers C-1 to C-14

Synthesis of Hydroxy Group-Terminated Urethane Prepolymer C-1

In a nitrogen atmosphere, the materials shown in Table 4 below were heated and stirred at a temperature of 90° C. for 3 hours to be reacted. Thereafter, 2-butanone (MEK) was added to the resultant reaction product to form a solution having a solid content of 50 parts by mass. Then, the hydroxy group-terminated urethane prepolymer C-1 was produced.

TABLE 4

| Material | Parts by mass |
|---|---|
| Raw material polyol A-1 (Trade name: DURANOL T5652, Manufactured by Asahi-Kasei Chemicals Corporation) | 100 |
| Raw material isocyanate B-1 (Trade name: MILLIONATE MT, Manufactured by Tosoh Corporation) | 6.3 |

Synthesis of Hydroxy Group-Terminated Urethane Prepolymers C-2 to C-14

The hydroxy group-terminated urethane prepolymers C-2 to C-14 were produced using the starting raw materials shown in Table 5 below by the same method as in the case of the synthesis of the hydroxy group-terminated urethane prepolymer C-1.

The chemical structures of the hydroxy group-terminated urethane prepolymers C-1 to C-14 were identified using $^1$H-NMR and $^{13}$C-NMR. In Table 5, m, n, o, p, q, r and s in the structural formulae (1), (2), (3) and (4) are the average addition mol numbers.

TABLE 5

| Hydroxy group-terminated | Raw material polyol | | Raw material isocyanate | | | | | |
|---|---|---|---|---|---|---|---|---|
| urethane prepolymer No. | No. | Parts by mass | No. | Parts by mass | Structure comprised in molecule | | | |
| C-1 | A-1 | 100 | B-1 | 6.3 | Structural formula (1) | R11 = $(CH_2)_5$ | R12 = $(CH_2)_6$ | m, n = 6.9 |
| C-2 | A-2 | 100 | B-1 | 5.7 | Structural formula (1) | R11 = $(CH_2)_4$ | R12 = $(CH_2)_6$ | m = 10.7, n = 4.6 |
| C-3 | A-3 | 100 | B-1 | 6.3 | Structural formula (1) | R11 = $(CH_2)_3$ | R12 = $(CH_2)_4$ | m, n = 8.8 |
| C-4 | A-4 | 100 | B-1 | 6.3 | Structural formula (1) | R11 = $(CH_2)_4$ | R12 = $(CH_2)_6$ | m = 14.5, n = 1.6 |
| C-5 | A-5 | 100 | B-1 | 6.3 | Structural formula (1) | R11 = $(CH_2)_6$ | R12 = $(CH_2)_2$—CHMe—$(CH_2)_2$ | m, n = 6.5 |
| C-6 | A-6 | 100 | B-1 | 6.3 | Structural formula (1) | R11 = $(CH_2)_6$ | R12 = $(CH_2)_2$—CHMe—$(CH_2)_2$ | m = 1.3, n = 11.8 |
| C-7 | A-7 | 100 | B-1 | 4.2 | Structural formula (1) | R11 = $(CH_2)_6$ | R12 = $(CH_2)_2$—CHMe—$(CH_2)_2$ | m = 2.0, n = 18.0 |
| C-8 | A-8 | 100 | B-1 | 6.3 | Structural formula (1) | R11 = $(CH_2)_9$ | R12 = $CH_2$—CHMe—$(CH_2)_6$ | m = 6.5, n = 3.5 |
| C-9 | A-9 | 100 | B-1 | 6.3 | Structural formula (1) | R11 = $(CH_2)_9$ | R12 = $CH_2$—CHMe—$(CH_2)_6$ | m = 3.5, n = 6.5 |
| C-10 | A-10 | 100 | B-5 | 4.3 | Structural formula (2) | | o = 9.1, p = 5.5 | |
| C-11 | A-17 | 100 | B-1 | 6.3 | Structural formula (3) | R31 = $(CH_2)_3$ | R32 = $(CH_2)_4$ | q = 12, r = 5.1 |
| C-12 | A-18 | 100 | B-1 | 6.3 | Structural formula (3) | R31 = $(CH_2)_6$ | R32 = $(CH_2)_8$ | q = 2.7, r = 6.3 |
| C-13 | A-11 | 100 | B-1 | 6.3 | Structural formula (4) | | R41 = $(CH_2)_6$ | s = 13.2 |
| C-14 | A-1 | 100 | B-3 | 4.8 | Structural formula (1) | R11 = $(CH_2)_5$ | R12 = $(CH_2)_6$ | m, n = 6.9 |

Concerning each of the hydroxy group-terminated urethane prepolymers C-1 to C-9, and C-14, which had structures represented by the structural formula (1) in molecules thereof, R13 in the structural formula (1) was the same as R12.

In the table, the description "x, y=A" such as m, n=6.9 represents that the average addition mol number of each of x and y was A. The above also applies in the following tables.

1-4. Production Examples of Isocyanate Group-Terminated Prepolymers D-1 to D-9

Synthesis of Isocyanate Group-Terminated Prepolymer D-1

In a nitrogen atmosphere, the materials shown in Table 6 below were heated and stirred at a temperature of 90° C. for 3 hours to be reacted. Thereafter, 2-butanone (MEK) was added to the resultant reaction product to form a solution having a solid content of 50 parts by mass. Then, the isocyanate group-terminated prepolymer D-1 was produced.

TABLE 6

| Material | Parts by mass |
|---|---|
| Raw material polyol A-10<br>(Trade name: Nippollan 982, Manufactured by Tosoh Corporation) | 100 |
| Raw material polyisocyanate B-2<br>(Trade name: MILLIONATE MR200, Manufactured by Tosoh Corporation) | 33.5 |

Synthesis of Isocyanate Group-Terminated Prepolymers D-2 to D-9

The isocyanate group-terminated prepolymers D-2 to D-9 were produced using the starting raw materials in the amounts shown in Table 7 below by the same method as in the case of the synthesis of the isocyanate group-terminated prepolymer D-1.

The chemical structures of these isocyanate group-terminated prepolymers D-1 to D-9 were identified using $^1$H-NMR and $^{13}$C-NMR. In Table 7, m, n, o, p, q, r and s in the structural formulae (1), (2), (3) and (4) are the average addition mol numbers.

TABLE 7

| Isocyanate group-terminated prepolymer No. | Raw material polyol No. | Raw material polyol Parts by mass | Raw material isocyanate No. | Raw material isocyanate Parts by mass | Structure comprised in molecule | | | |
|---|---|---|---|---|---|---|---|---|
| D-1 | A-10 | 100 | B-2 | 33.5 | Structural formula (2) | o = 9.1, p = 5.5 | | |
| D-2 | A-14 | 100 | B-6 | 78.4 | Structural formula (1) | R11 = $(CH_2)_6$ | R12 = $CH_2$—CH < $(CH_2)_2$ > CH—$CH_2$<br>$(CH_2)_2$ | m, n = 2.7 |
| D-3 | A-15 | 100 | B-6 | 78.4 | Structural formula (1) | R11 = $(CH_2)_6$ | R12 = $CH_2$—CH < $(CH_2)_2$ > CH—$CH_2$<br>$(CH_2)_2$ | m = 4.1, n = 1.4 |
| D-4 | A-13 | 100 | B-6 | 70.3 | Structural formula (4) | R41 = $CH_2$—CH < $(CH_2)_2$ > CH—$CH_2$<br>$(CH_2)_2$ | | s = 5.8 |
| D-5 | A-11 | 100 | B-2 | 33.5 | Structural formula (4) | R41 = $(CH_2)_6$ | | s = 13.2 |
| D-6 | A-12 | 100 | B-2 | 28.2 | Structural formula (4) | R41 = $(CH_2)_6$ | | s = 20.1 |
| D-7 | A-16 | 100 | B-6 | 70.3 | Structural formula (4) | R41 = $CH_2$—CEtBu—$CH_2$ | | s = 4.6 |
| D-8 | A-10 | 100 | B-4 | 102.2 | Structural formula (2) | o = 9.1, p = 5.5 | | |
| D-9 | A-1 | 100 | B-2 | 33.5 | Structural formula (1) | R11 = $(CH_2)_6$ | R12 = $(CH_2)_6$ | m:n = 1:1 |

Concerning each of the isocyanate group-terminated prepolymers D-2 and D-3, which had structures represented by the structural formula (1) in molecules thereof, R13 in the structural formula (1) was the same as at least one selected from the group consisting of R11 and R12. Concerning the isocyanate group-terminated prepolymer D-9, which had a structure represented by the structural formula (1) in a molecule thereof, R13 in the structural formula (1) was the same as R12.

2. Preparation and Production of Resin Layer Additive Raw Material

2-1. Preparation and Production Examples of Polyoxyethylene Polyoxypropylene Alkyl Ethers E-1 to E-7

Preparation of Polyoxyethylene Polyoxypropylene Alkyl Ethers

The additives E-1 to E-5 shown in Table 8 below, which were polyoxyethylene polyoxypropylene alkyl ethers, were purchased commercially available products. The polyoxyethylene polyoxypropylene alkyl ethers E-6 and E-7 were synthesized.

Synthesis of Polyoxyethylene Polyoxypropylene Alkyl Ether E-6

To an autoclave provided with a stirring device, a temperature controlling device, and an autoloading device, 169.3 g of 1-octanol (manufactured by Tokyo Chemical Industry Co., Ltd.), and 3.0 g of potassium hydroxide were put, and dehydrated at 110° C. at 1.2 kPa for 30 minutes. After the dehydration, nitrogen substitution was performed, the temperature was raised to 150° C., and thereafter, 858.0 g of ethylene oxide (to a 15 mol alcohol) was loaded. The reaction was allowed to occur at 150° C. for 1 hour, and an ethylene oxide adduct having an average addition mol number of 15 mol was obtained.

The obtained ethylene oxide adduct was cooled to 130° C., and thereafter, 1132.6 g of propylene oxide (to a 15 mol alcohol) was loaded. After the loading, the reaction was allowed to occur at 130° C. for 5 hours, and a polyoxyethylene polyoxypropylene octyl ether adduct that was a block polymer of ethylene oxide having an average addition mol number of 15 mol, and propylene oxide having an average addition mol number of 15 mol was obtained.

The obtained polyoxyethylene polyoxypropylene octyl ether adduct was cooled to 80° C., and unreacted ethylene oxide and propylene oxide were removed at 2.5 kPa for 30 minutes. Next, 6.0 g of 90% lactic acid was put in the autoclave to be stirred at 80° C. for 30 minutes, and thereafter, was subjected to extraction. Then, the polyoxyethylene polyoxypropylene octyl ether E-6 was obtained. The structure of R51, and the values of t and u in E-6 are shown in Table 8.

Synthesis of Polyoxyethylene Polyoxypropylene Alkyl Ether E-7

To an autoclave provided with a stirring device, a temperature controlling device, and an autoloading device, 550.0 g of a polyoxyethylene methyl ether (trade name: BLAUNON MP-550, manufactured by AOKI OIL INDUSTRIAL CO., LTD., the average addition mol number of ethylene oxide was 12 mol to an alcohol) and 3.0 g of potassium hydroxide were put, and dehydrated at 110° C. at 1.2 kPa for 30 minutes. After the dehydration, nitrogen substitution was performed, the temperature was raised to 130° C., and thereafter, 871.2 g of propylene oxide (to a 12 mol alcohol) was loaded. After the loading, the reaction was allowed to occur at 130° C. for 4 hours, and a polyoxyethylene polyoxypropylene methyl ether adduct that was a block polymer of ethylene oxide having an average addition mol number of 12 mol, and propylene oxide having an average addition mol number of 12 mol was obtained.

The obtained polyoxyethylene polyoxypropylene methyl ether adduct was cooled to 80° C., and unreacted propylene oxide was removed at 2.5 kPa for 30 minutes. Next, 6.0 g of 90% lactic acid was put in the autoclave to be stirred at 80° C. for 30 minutes, and thereafter, was subjected to extraction. Then, the polyoxyethylene polyoxypropylene methyl ether E-7 was obtained. The structure of R51, and the values of t and u in E-7 are shown in Table 8.

TABLE 8

| No. | Material | Structure | | |
|---|---|---|---|---|
| E-1 | Polyoxyethylene polyoxypropylene butyl ether (Trade name: UNILUBE 50MB-26, Manufactured by NOF CORPORATION) | Structural formula (5) | R51 = $C_4H_9$ | t, u = 17 |
| E-2 | Polyoxyethylene polyoxypropylene butyl ether (Trade name: UNILUBE 50MB-72, Manufactured by NOF CORPORATION) | Structural formula (5) | R51 = $C_4H_9$ | t, u = 30 |
| E-3 | Polyoxyethylene polyoxypropylene butyl ether (Trade name: UNILUBE 50MB-11, Manufactured by NOF CORPORATION) | Structural formula (5) | R51 = $C_4H_9$ | t = 9, u = 10 |
| E-4 | Polyoxyethylene polyoxypropylene lauryl ether (Trade name: NONION A-13PR, Manufactured by NOF CORPORATION) | Structural formula (5) | R51 = $C_{12}H_{25}$ | t, u = 5 |
| E-5 | Polyoxyethylene polyoxypropylene lauryl ether (Trade name: NONION A-25B, Manufactured by NOF CORPORATION) | Structural formula (5) | R51 = $C_{12}H_{25}$ | t, u = 25 |
| E-6 | Polyoxyethylene polyoxypropylene octyl ether | Structural formula (5) | R51 = $C_8H_{17}$ | t, u = 15 |
| E-7 | Polyoxyethylene polyoxypropylene methyl ether | Structural formula (5) | R51 = $CH_3$ | t, u = 12 |

2-2. Preparation and Production Examples of Polyetheramines

Preparation of Polyetheramines

E-8 and E-9 shown in Table 9 below, which were polyetheramines as additives, were purchased commercially available products. The polyetheramine E-10 was synthesized.

Synthesis of Polyetheramine E-10

An agitator was attached to a three-neck flask, and 1658 g of a polyoxyethylene polyoxypropylene octyl ether and 460 mL of acetic acid were put into the flask. To the resultant, 600 mL of a 2 mol/L sodium hypochlorite aqueous solution was added dropwise over 1 hour. The reaction vessel was put in an ice bath to be cooled so that the temperature was within the range of 15 to 25° C. After the addition, the resultant was continuously stirred for 1 hour. Dichloromethane was added to the obtained liquid, an aqueous layer was extracted, and the resultant was subjected to a post-treatment and refined using a column, and then, a compound of a ketonized secondary alcohol was obtained.

The temperature was cooled down to 0° C. by the ice bath, 250 mL of a methanol-acetic acid mixed solution (the capacity ratio was 10:1) was added to 41.4 g of the obtained compound of the ketonized secondary alcohol, and 2.7 g of 2-picoline borane was further added. The ice bath was removed, and the resultant was stirred in an open system at room temperature overnight. The resultant was concentrated, and thereafter cooled to 0° C., 360 mL of a 35% hydrochloric acid aqueous solution was added, and the resultant was stirred at room temperature for 2 hours. A sodium hydroxide aqueous solution was added to basify the resultant, an aqueous layer was extracted using dichloromethane, and the resultant was subjected to a post-treatment and refined using a column, and then, the polyetheramine E-10 was obtained. The structure of R61, and the values of v and w of E-10 are shown in Table 9.

TABLE 9

| No. | Material | Structure | | |
|---|---|---|---|---|
| E-8 | Polyetheramine (Trade name: JEFFAMINE M-2005, Manufactured by Huntsman International LLC.) | Structural formula (6) | R61 = $CH_3$ | v = 6, w = 29 |
| E-9 | Polyetheramine (Trade name: JEFFAMINE M-600, Manufactured by Huntsman International LLC.) | Structural formula (6) | R61 = $CH_3$ | v = 1, w = 9 |
| E-10 | Polyetheramine | Structural formula (6) | R61 = $C_8H_{17}$ | v, w = 15 |

2-3. Preparation and Production Examples of Polyoxyethylene Alkyl Ether Acetic Acids

Preparation of Polyoxyethylene Alkyl Ether Acetic Acids

E-11 shown in Table 10 below, which was a polyoxyethylene alkyl ether acetic acid as an additive, was a purchased commercially available product. The polyoxyethylene alkyl ether acetic acids E-12 and E-13 were synthesized.

Synthesis of Polyoxyethylene Alkyl Ether Acetic Acid E-12

Mixed were 55.0 g of a polyoxyethylene methyl ether (trade name: BLAUNON MP-550, manufactured by AOKI OIL INDUSTRIAL CO., LTD., the average addition mol number of ethylene oxide was 12 mol to an alcohol) and 510 mL of a 1 mol/L sodium hydroxide aqueous solution, 71.1 g of potassium permanganate was added, and the resultant was stirred at room temperature for 6 hours. Thereafter, 760 mL of 2-propanol was added, the resultant was stirred for 1 hour to quench excessive potassium permanganate, and further, manganese oxide, which was a by-product, was filtrated off. An aqueous layer was extracted with dichloromethane, the resultant was refined, and then, E-12, which was a polyoxyethylene methyl ether acetic acid, was obtained. The structure of R71, and the value x of E-12 are shown in Table 10.

Synthesis of Polyoxyethylene Alkyl Ether Acetic Acid E-13

To an autoclave provided with a stirring device, a temperature controlling device, and an autoloading device, 169.3 g of 1-octanol (manufactured by Tokyo Chemical Industry Co., Ltd.), and 3.0 g of potassium hydroxide were put, and dehydrated at 110° C. at 1.2 kPa for 30 minutes. After the dehydration, nitrogen substitution was performed, the temperature was raised to 150° C., and thereafter, 858.0 g of ethylene oxide (to a 15 mol alcohol) was loaded. The reaction was allowed to occur at 150° C. for 1 hour, and then, an ethylene oxide adduct having an average addition mol number of 15 mol was obtained.

Mixed were 77.4 g of the obtained ethylene oxide adduct and 510 mL of a 1 mol/L sodium hydroxide aqueous solution, 71.1 g of potassium permanganate was added, and the resultant was stirred at room temperature for 6 hours. Thereafter, 760 mL of 2-propanol was added, the resultant was stirred for 1 hour to quench excessive potassium permanganate, and further, manganese oxide, which was a by-product, was filtrated off. An aqueous layer was extracted with dichloromethane, the resultant was refined, and then, E-13, which was a polyoxyethylene methyl ether acetic acid, was obtained. The structure of R71, and the value x of E-13 are shown in Table 10.

TABLE 10

| No. | Material | Structure | | |
|---|---|---|---|---|
| E-11 | Polyoxyethylene lauryl ether acetic acid (Trade name: Taiporusohuto ECA-490, Manufactured by TAIKO OIL CHEM. Co., Ltd.) | Structural formula (7) | R71 = $C_{12}H_{25}$ | x = 5 |
| E-12 | Polyoxyethylene methyl ether acetic acid | Structural formula (7) | R71 = $CH_3$ | x = 11 |
| E-13 | Polyoxyethylene octyl ether acetic acid | Structural formula (7) | R71 = $C_8H_{17}$ | x = 14 |

3. Production Examples of Coating Liquids for Forming Resin Layer F-1 to F-44

3-1. Preparation of Coating Liquid for Forming Resin Layer F-1

The Materials in the amounts shown in Table 11 below were put into a reaction vessel as the materials of a coating liquid for forming a resin layer F-1, and were stirred. Next, 2-butanone (MEK) was added so that the total solid content ratio was 30 mass %, and thereafter, the resultant was mixed in a sand mill. Next, 2-butanone (MEK) was added so that the viscosity of the resultant liquid was adjusted to be within the range of 6 to 10 mPa·s. Then, the coating for forming a resin layer F-1 was produced.

TABLE 11

| Material | Parts by mass |
|---|---|
| Hydroxy group-terminated urethane prepolymer C-1 | 100 |
| Isocyanate group-terminated urethane prepolymer D-5 | 54.7 |
| Additive E-1 | 7 |
| Carbon black | 35 |
| (Trade name: MA8, Manufactured by Mitsubishi Chemical Corporation) | |
| Roughening particle | 23 |
| (Trade name: ART PEARL C-400T, Manufactured by Negami Chemical Industrial Co., Ltd.) | |

3-2. Preparation of Coating Liquids for Forming Resin Layer F-2 to F-44

The coating liquids for forming a resin layer F-2 to F-44 were each produced by the following method. First, the hydroxy group-terminated urethane prepolymer, the isocyanate group-terminated prepolymer, the additive, the carbon black, and the roughening particle shown in Table 12 below were mixed by the same method as in the case of the preparation of the coating liquid for forming a resin layer F-1. Thereafter, 2-butanone (MEK) was added so that the viscosity of the resultant liquid was adjusted to be within the range of 6 to 10 mPa-s. Then, the coatings for forming a resin layer F-2 to F-44 were produced.

TABLE 12

| | Hydroxy group-terminated urethane prepolymer | | Isocyanate group-terminated urethane prepolymer | | Additive | | Carbon black | Roughening particle |
|---|---|---|---|---|---|---|---|---|
| | No. | Parts by mass | No. | Parts by mass | No. | Parts by mass | Parts by mass | Parts by mass |
| F-1 | C-1 | 100 | D-5 | 54.7 | E-1 | 7 | 35 | 23 |
| F-2 | C-3 | 100 | D-5 | 54.7 | E-1 | 7 | 35 | 23 |
| F-3 | C-5 | 100 | D-5 | 54.7 | E-1 | 7 | 35 | 23 |
| F-4 | C-7 | 100 | D-5 | 37.2 | E-1 | 6.4 | 32 | 21 |
| F-5 | C-13 | 100 | D-3 | 54.7 | E-1 | 7 | 35 | 23 |
| F-6 | C-1 | 100 | D-6 | 54.7 | E-1 | 7 | 35 | 23 |
| F-7 | C-7 | 100 | D-4 | 37.2 | E-1 | 6.4 | 32 | 21 |
| F-8 | C-9 | 100 | D-7 | 54.7 | E-1 | 7 | 35 | 23 |
| F-9 | C-1 | 100 | D-1 | 54.7 | E-1 | 7 | 35 | 23 |
| F-10 | C-2 | 100 | D-1 | 54.7 | E-1 | 7 | 35 | 23 |
| F-11 | C-3 | 100 | D-1 | 54.7 | E-1 | 7 | 35 | 23 |
| F-12 | C-4 | 100 | D-1 | 54.7 | E-1 | 7 | 35 | 23 |
| F-13 | C-5 | 100 | D-1 | 54.7 | E-1 | 7 | 35 | 23 |
| F-14 | C-6 | 100 | D-1 | 54.7 | E-1 | 7 | 35 | 23 |
| F-15 | C-7 | 100 | D-1 | 37.2 | E-1 | 6.4 | 32 | 21 |
| F-16 | C-8 | 100 | D-1 | 54.7 | E-1 | 7 | 35 | 23 |
| F-17 | C-9 | 100 | D-1 | 54.7 | E-1 | 7 | 35 | 23 |
| F-18 | C-10 | 100 | D-2 | 54.7 | E-1 | 7 | 35 | 23 |
| F-19 | C-10 | 100 | D-3 | 54.7 | E-1 | 7 | 35 | 23 |
| F-20 | C-11 | 100 | D-5 | 54.7 | E-1 | 7 | 35 | 23 |
| F-21 | C-12 | 100 | D-5 | 54.7 | E-1 | 7 | 35 | 23 |
| F-22 | C-13 | 100 | D-1 | 54.7 | E-1 | 7 | 35 | 23 |
| F-23 | C-10 | 100 | D-4 | 54.7 | E-1 | 7 | 35 | 23 |
| F-24 | C-10 | 100 | D-7 | 54.7 | E-1 | 7 | 35 | 23 |
| F-25 | C-1 | 50 | D-5 | 54.7 | E-1 | 7 | 35 | 23 |
| | C-10 | 50 | | | | | | |
| F-26 | C-14 | 100 | D-1 | 54.7 | E-1 | 7 | 35 | 23 |
| F-27 | C-1 | 100 | D-5 | 54.7 | E-1 | 6.6 | 35 | 23 |
| F-28 | C-1 | 100 | D-5 | 54.7 | E-1 | 16.1 | 35 | 23 |

TABLE 12-continued

| | Hydroxy group-terminated urethane prepolymer | | Isocyanate group-terminated urethane prepolymer | | Additive | | Carbon black | Roughening particle |
|---|---|---|---|---|---|---|---|---|
| | No. | Parts by mass | No. | Parts by mass | No. | Parts by mass | Parts by mass | Parts by mass |
| F-29 | C-1 | 100 | D-5 | 54.7 | E-2 | 7 | 35 | 23 |
| F-30 | C-1 | 100 | D-5 | 54.7 | E-3 | 7 | 35 | 23 |
| F-31 | C-1 | 100 | D-5 | 54.7 | E-4 | 7 | 35 | 23 |
| F-32 | C-1 | 100 | D-5 | 54.7 | E-5 | 7 | 35 | 23 |
| F-33 | C-1 | 100 | D-5 | 54.7 | E-6 | 7 | 35 | 23 |
| F-34 | C-1 | 100 | D-5 | 54.7 | E-7 | 7 | 35 | 23 |
| F-35 | C-1 | 100 | D-5 | 54.7 | E-8 | 7 | 35 | 23 |
| F-36 | C-1 | 100 | D-5 | 54.7 | E-8 | 6.6 | 35 | 23 |
| F-37 | C-1 | 100 | D-5 | 54.7 | E-8 | 16.1 | 35 | 23 |
| F-38 | C-1 | 100 | D-5 | 54.7 | E-9 | 7 | 35 | 23 |
| F-39 | C-1 | 100 | D-5 | 54.7 | E-10 | 7 | 35 | 23 |
| F-40 | C-1 | 100 | D-5 | 54.7 | E-11 | 7 | 35 | 23 |
| F-41 | C-1 | 100 | D-5 | 54.7 | E-11 | 6.6 | 35 | 23 |
| F-42 | C-1 | 100 | D-5 | 54.7 | E-11 | 16.1 | 35 | 23 |
| F-43 | C-1 | 100 | D-5 | 54.7 | E-12 | 7 | 35 | 23 |
| F-44 | C-1 | 100 | D-5 | 54.7 | E-13 | 7 | 35 | 23 |

Example 1

1. Production of Electrophotographic Roller

In this example, an electrophotographic roller formed by coating, with a resin layer, an elastic roller provided with an elastic layer on an outer surface of a substrate is described. However, the structure of the electrophotographic roller is not limited to this.

1-1 Preparation of Substrate

As the substrate, a member formed by applying a primer (trade name: DY35-051, manufactured by Dow Toray Co., Ltd.) onto the side face of a cored bar made from stainless steel (SUS304) having a diameter of 6 mm, and baking the resultant was prepared.

1-2. Preparation of Elastic Layer

The substrate was placed in a metal mold, and an addition-type silicone rubber composition prepared by mixing the materials shown in Table 13 was injected into a cavity formed in the metal mold.

TABLE 13

| Material | Parts by mass |
|---|---|
| Liquid silicone rubber<br>(Trade name: SE6724 A/B, Manufactured by Dow Toray Co., Ltd.) | 100 |
| Carbon black<br>(Trade name: TOKABLACK #4300, Manufactured by Tokai Carbon Co., Ltd.) | 16 |
| Curing control agent<br>(Trade name: 1-ethynyl-1-cyclohexanol, Manufactured by Tokyo Chemical Industry Co., Ltd.) | 0.01 |
| Platinum catalyst<br>(Trade name: SIP6830.3, Gelest Inc) | 0.01 |

Subsequently, the metal mold was heated so that the silicone rubber was vulcanized and cured at a temperature of 150° C. for 15 minutes. The resultant was released from the mold, and further heated at a temperature of 180° C. for 1 hour, to complete the curing reaction. Then, an elastic roller having a diameter of 11.5 mm which was provided with an elastic layer was formed around the periphery of the substrate.

1-3. Preparation of Resin Layer

The elastic roller was dipped in the coating liquid for forming a resin layer F-1 while an upper end portion of the elastic roller, the longitudinal direction of which was directed in the vertical direction, was held, and the coating liquid was applied onto the surface of the elastic roller. The obtained coated member was air-dried at normal temperature for 30 minutes, and next, was dried in a hot air circulation dryer that was set to be at 160° C. in temperature for 1 hour. According to this, the electrophotographic roller G-1 having a resin layer of 12 μm in film thickness which was formed on the elastic layer was obtained.

2. Measurement of Impedance

The impedance was measured as follows.

First, as a pretreatment, a measuring electrode was prepared by subjecting the electrophotographic roller G-1 to vacuum platinum deposition while rotating the roller G-1. For this deposition, a vacuum vapor deposition device having a mechanism of gripping the base portion of the roller, which was a film-formed member, and rotating the roller in a circumferential direction was used. The deposition was performed while the roller rotation speed, deposition distance, and deposition time were controlled so that the film thickness was at least 100 nm. At this time, an electrode having a width of 1.5 cm was made using a masking tape. The formation of the electrode having a film thickness of at least 100 nm can cause the contribution of the contact area between the measuring electrode and the electrophotographic roller due to the surface roughness of the electrophotographic roller to be less to the utmost.

Next, an aluminum sheet was wound around the electrode without any gap, and the roller was connected to a measuring electrode of an impedance measuring apparatus (trade name: Solartron 1260 and Solartron 1296, manufactured by Solartron Analytical) and a high voltage system (trade name: 6792 and HVA-500, manufactured by TOYO Corporation) via the aluminum sheet.

Figure 5:
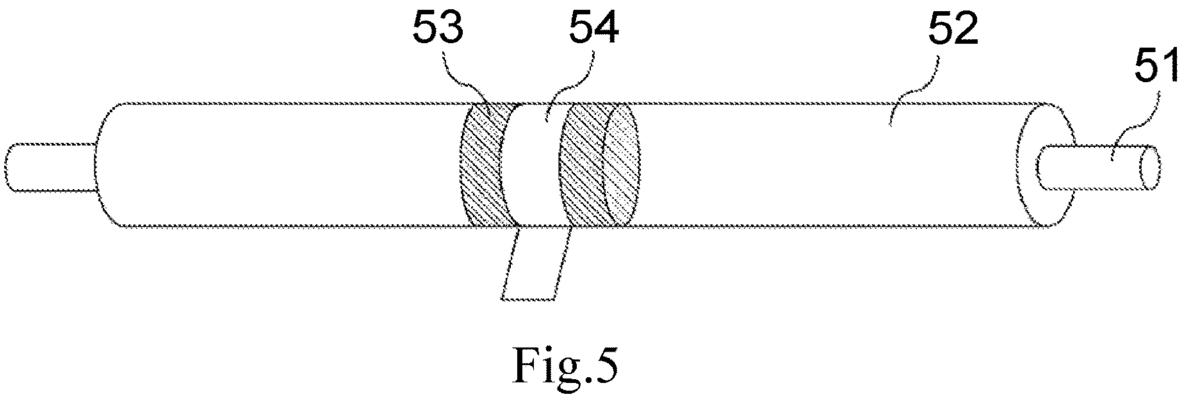
FIG. 5 is a schematic view of a state where a measuring electrode was formed on an electrophotographic roller.

FIG. 5 is a schematic view of a state where the measuring electrode was formed on the electrophotographic roller. In FIG. 5, 51 denotes the conductive substrate, 52 denotes the resin layer, 53 denotes the platinum-deposited layer, and 54 denotes the aluminum sheet. FIG. 5 does not show the elastic layer. But the elastic layer was present between the substrate 51 and the resin layer 52.

Figure 6:
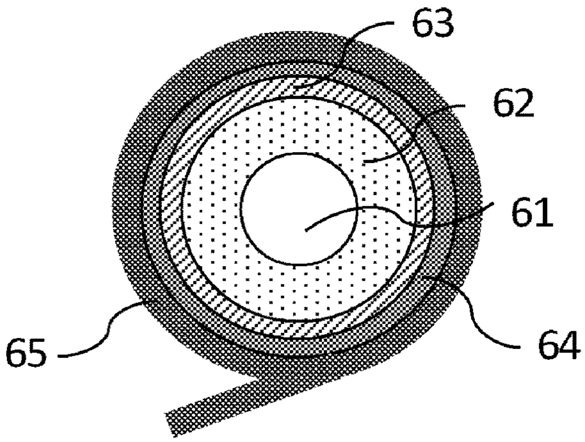
FIG. 6 is a cross-sectional view of the electrophotographic roller and the measuring electrode.

FIG. 6 is a cross-sectional view of a state where the measuring electrode was formed on the electrophotographic roller. In FIG. 6, 61 denotes the conductive substrate, 62 denotes the elastic layer, 63 denotes the resin layer, 64 denotes the platinum-deposited layer, and 65 denotes the aluminum sheet. As in FIG. 6, it is important to be in a state of holding the resin layer between the conductive substrate and the measuring electrode.

Figure 7:
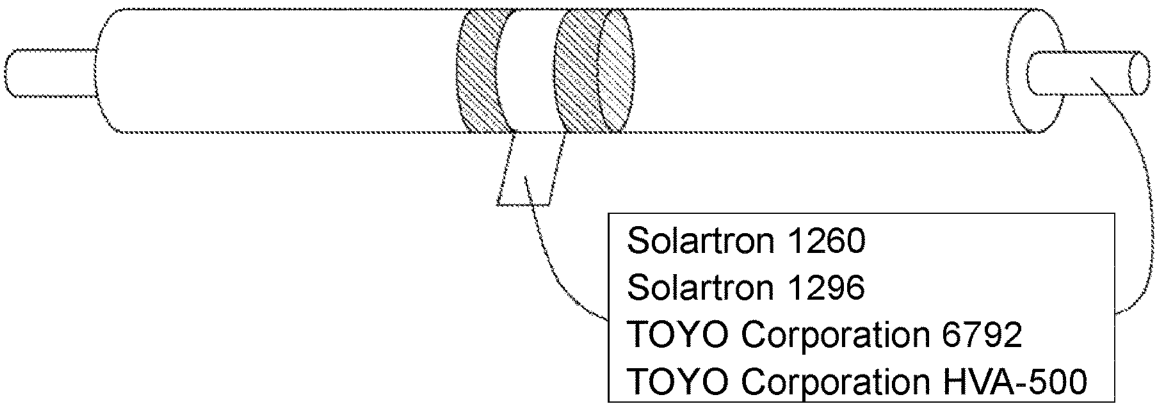
FIG. 7 is a schematic view of an impedance measuring system.

The aluminum sheet was connected to the measuring electrode on the side of the impedance measuring apparatus (Solartron 1260 and Solartron 1296 manufactured by Solartron Analytical) and the high voltage system (trade name: 6792 and HVA-500 manufactured by TOYO Corporation). FIG. 7 shows a schematic view of this measurement system. The conductive substrate and the aluminum sheet were used as two electrodes for the measurement, and then, the impedance measurement was performed.

In the impedance measurement, under the environment where the temperature was 23° C. and the relative humidity was 50%, 50 V of a DC voltage, and 50 V of an AC voltage were applied, and the absolute value of the impedance at a frequency of $1.0\times10^{-1}$ to $1.0\times10^{5}$ Hz was obtained. Then, the minimum value of the impedance value at a frequency of $1.0\times10^{0}$ to $1.0\times10^{1}$ Hz was confirmed. The measurement point of the impedance was at the central portion of the electrophotographic roller in the longitudinal direction.

3. Measurement of Surface Electric Potential

The surface electric potential of the electrophotographic roller was measured using a charge quantity measuring apparatus (trade name: DRA-2000L, manufactured by Quality Engineering Associates, Inc.). Specifically, under the environment of 23° C. in temperature and 50% in relative humidity, a grid part of a corona discharger of the charge quantity measuring apparatus was arranged so that the gap between the grid part and the outer surface of the electrophotographic roller was 1.0 mm. The grid part of the corona discharger of this apparatus had a width of 3.0 mm.

Next, a voltage of 8 kV was applied to the corona discharger, and the corona discharger was moved in the axial direction of the electrophotographic roller at a velocity of 400 mm/sec relatively to charge the surface of the conductive member. The electric potential of the outer surface 0.06 seconds after the grid part had passed was measured. The maximum value among all the measured values when eight points in the longitudinal direction of the electrophotographic roller at every 45° in the circumferential direction thereof were measured.

4. Calculation of Physical Properties Such as Circle-Equivalent Diameter and Distance Between Wall Surfaces of Carbon Black Dispersed in Resin Layer The circle-equivalent diameter and the distance between wall surfaces of the carbon black dispersed in the resin layer were measured by the following method.

First, a slice (0.5 to 1.0 mm in thickness) was cut out with a razor so that a cross section perpendicular to the longitudinal direction of the electrophotographic roller was observable. When the adhesiveness of the substrate and the resin layer was so strong that it was difficult to cut out with a razor, the resin layer was cut out together with the substrate by using a metal cutting saw or the like, and thereafter, cross-sectioned using a FIB (Focused Ion Beam) device.

Next, the slice was subjected to platinum deposition, and the resin layer was photographed using a scanning electron microscope (SEM) (trade name: JSM-7800F, manufactured by JEOL Ltd.) at a magnification of 15000 to obtain a cross-sectional image.

Further, to quantify the cross-sectional image obtained by the observation using SEM, the cross-sectional image was subjected to 8-bit gray scaling by the use of image processing software (trade name: LUZEX-AP, manufactured by NIRECO CORPORATION) to obtain a monochromatic image with 256 gradations. Next, the image was subjected to tone reversal processing so that the carbon black in the cross-sectional image looked white, and thereafter, the threshold for binarization was set for the brightness distribution of the image based on the algorithm of Otsu's discriminant analysis method. Then, a binarized image where the carbon black was white, and the binder resin portion was black was obtained.

Using image processing software (trade name: LUZEX-AP, manufactured by NIRECO CORPORATION) for the obtained binarized image, the circle-equivalent diameter and the distance between adjacent wall surfaces of the carbon black portion, which was white, was calculated. For eliminating the uncertainty over the calculated values of the carbon black, the portion of which was cut out at the top, bottom, left and right ends of the image, the area having dimensions 0.075 μm inside the actual dimensions of the image (0.075 μm inside the portion where the actual image started when there was a letter portion where the SEM measurement conditions etc. were described) was set as the image area. The circle-equivalent diameter and the distance between adjacent wall surfaces of the entire carbon black in the designated image area were calculated.

The arithmetic mean values and the standard deviations of the obtained circle-equivalent diameter, and the distance between adjacent wall surfaces were calculated. Nothing mattered in particular when the number of the prints of the image subjected to image analysis was at least one, but this number was at least three for eliminating the influence of, for example, differences between the places in the longitudinal direction in carbon black dispersed in the resin layer of the electrophotographic roller.

The number average diameter of the primary particle of the carbon black dispersed in the resin layer was measured by transmission electron microscopy (TEM). First, a thinned sample was made. For the thinning, any known method could be used. For example, the sample could be thinned using an ion beam, a diamond knife, or the like. In the present disclosure, a thinned sample for observation which had a thickness of 40 nm was made using an ultramicrotome (trade name: ULTRACUT-S, manufactured by Leica Microsystems).

Then, a TEM image was acquired using a transmission electron microscopy (trade name: H-7100FA, manufactured by Hitachi High-Tech Corporation) in a TE mode under the measurement condition of an acceleration voltage of 100 kV.

The circle-equivalent diameters of any chosen fifty primary particles of the carbon black on the acquired TEM image were measured using image analysis software (trade name: WinROOF, manufactured by Mitani Corporation), and the number average value of these fifty particles were used as the number average diameter of the primary particle.

Measurement of DBP Absorption Amount of Carbon Black

As for the powder of the carbon black, the DBP absorption amount of the carbon black was measured conforming to Japanese Industrial Standards (JIS) K6217-4.

Measurement of pH of Carbon Black

As for the powder of the carbon black, the pH of the carbon black was measured conforming to ASTM D1512.

5. Image Evaluation

The image evaluation method will be described below.

Figure 10:
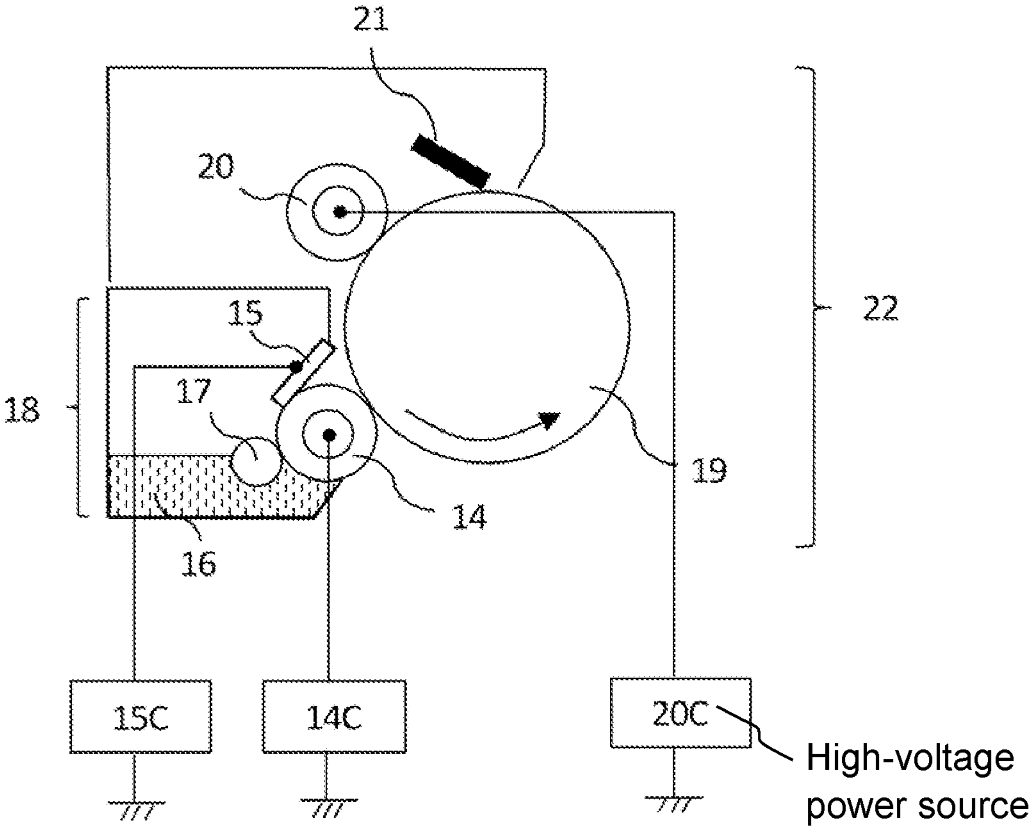
FIG. 10 is a schematic view of an electrophotographic image forming apparatus for image evaluation.

LBP-7600C (manufactured by Canon Inc.), which was a commercially available laser printer, was converted and used as the electrophotographic image forming apparatus. FIG. 10 shows the structure of the converted apparatus. The following were the points of the conversion: the apparatus could connect to an external high-voltage power source 20C in addition to power sources 14C and 15C so as to give a discretionary electric potential difference between the developing blade and the electrophotographic roller; and for the evaluation in high-speed processing, the number of prints outputted per unit time was set to be 50 prints/min when an A4 sheets were used.

A commercially available toner cartridge 318 (black) (manufactured by Canon Inc.) was used as the process cartridge, and the developing roller was exchanged for the electrophotographic roller G-1. At this time, the filling amount was adjusted so that the toner was 100 g. Yellow, cyan and magenta cartridges for which a toner remaining amount detection mechanism was ineffective were inserted into stations for yellow, cyan, and magenta, respectively, from which product toners had been removed. Then, the evaluation was performed.

5-1. Fogging Evaluation

The prepared process cartridge was installed in the main body of the electrophotographic image forming apparatus, and allowed to stand under the environment of 30° C. in temperature, and 80% in relative humidity for 24 hours. Thereafter, the electric potential difference between the developing blade and the electrophotographic roller was set in −300 V by the use of the external high-voltage power source, and under the same conditions, the following images were continuously outputted on A4 sheets of paper for evaluation (GF-C081 manufactured by Canon Inc.): the print percentage of the alphabetical letters "E" each having 4 points in size was 2% to the area of each of the A4 sheets of paper. A solid white image was outputted every time when 1000 prints were outputted. This was repeated until the number of the outputted prints reached 20000, and the fogging values were measured by the following method.

Using a reflection densitometer (trade name: TC-6DS/A, manufactured by Tokyo Denshoku CO., LTD.), the reflection density R1 of the recording member before the image formation, and the reflection density R2 of the recording member after each of the solid white images was outputted were measured, and the increase of the reflection density (R2-R1) was defined as the "fogging value" of the electrophotographic roller. The reflection densities were measured over the entire image printing areas of the recording members: the arithmetic mean value was used for the recording member before the image formation; and the maximum value was used for the recording member after the solid white image was outputted. Next, the arithmetic mean value of the fogging values of respective images in 20000 prints was calculated. The smaller the fogging value was, the better. Usually, toner is not transferred onto transfer paper where a solid white image is formed. When the charge quantity of toner does not suffice, the toner moves onto a photosensitive member even when a solid white image is formed, and further, is also transferred onto transfer paper, which causes a fogging value to be larger. The evaluation results are shown in Table 14-6.

Fogging seems to tend to easily occur under a high-temperature high-humidity environment of 30° C. in temperature, and 80% in relative humidity. Then, the evaluation was carried out under the environment of 30° C. in temperature, and 80% in relative humidity.

5-2. Evaluation of Image Density Stability

The prepared process cartridge was installed in the main body of the electrophotographic image forming apparatus, and allowed to stand under the environment of 23° C. in temperature, and 50% in relative humidity for 24 hours. Thereafter, the electric potential difference between the developing blade and the electrophotographic roller was set in −300 V by the use of the external high-voltage power source, and one print of a 25% halftone image to solid black, 48 prints of solid white images, and one print of a 25% halftone image to solid black were continuously outputted in this order. The densities of the obtained first and fiftieth prints of the halftone images were measured using a spectrodensitometer (trade name: 508, manufactured by X-Rite, Inc.), and the density difference between the first and fiftieth prints was obtained. The smaller the density difference was, the better. The evaluation results are shown in Table 14-6.

Examples 2 to 44

In each of examples 2 to 44, the electrophotographic rollers G-2 to G-44 were produced in the same manner as in example 1, and each of the measurements and evaluations was carried out in the same manner as in example 1 except that the coatings for forming the surface layer were changed to those (F-2 to F-44) shown in Tables 14-1 to 14-6.

The physical properties and the evaluation results are shown in Tables 14-5 and 14-6.

TABLE 14-1

| Example | Electro-photographic roller No. | Coating liquid for forming resin layer No. | Structure of binder resin: Structure I | | | | Structure II | | | |
|---|---|---|---|---|---|---|---|---|---|---|
| 1 | G-1 | F-1 | Formula (1) | R11 = $(CH_2)_5$ | R12 = $(CH_2)_6$ | m, n = 6.9 | Formula (4) | | R41 = $(CH_2)_6$ | s = 13.2 |
| 2 | G-2 | F-2 | Formula (1) | R11 = $(CH_2)_5$ | R12 = $(CH_2)_4$ | m, n = 8.8 | Formula (4) | | R41 = $(CH_2)_6$ | s = 13.2 |
| 3 | G-3 | F-3 | Formula (1) | R11 = $(CH_2)_6$ | R12 = $(CH_2)_2$—CHMe—$(CH_2)_2$ | m, n = 6.5 | Formula (4) | | R41 = $(CH_2)_6$ | s = 13.2 |
| 4 | G-4 | F-4 | Formula (1) | R11 = $(CH_2)_6$ | R12 = $(CH_2)_2$—CHMe—$(CH_2)_2$ | m = 2.0, n = 18.0 | Formula (4) | | R41 = $(CH_2)_6$ | s = 13.2 |
| 5 | G-5 | F-5 | Formula (4) | | R41 = $(CH_2)_6$ | s = 13.2 | Formula (1) | R11 = $(CH_2)_6$ | R12 = $CH_2$—CH < $(CH_2)_2$ > CH—$CH_2$ $(CH_2)_2$ | m = 4.1, n = 1.4 |
| 6 | G-6 | F-6 | Formula (1) | R11 = $(CH_2)_5$ | R12 = $(CH_2)_6$ | m, n = 6.9 | Formula (4) | | R41 = $(CH_2)_6$ | s = 20.1 |
| 7 | G-7 | F-7 | Formula (1) | R11 = $(CH_2)_6$ | R12 = $(CH_2)_2$—CHMe—$(CH_2)_2$ | m = 2.0, n = 18.0 | Formula (4) | | R41 = $CH_2$—CH < $(CH_2)_2$ > CH—$CH_2$ $(CH_2)_2$ | s = 5.8 |
| 8 | G-8 | F-8 | Formula (1) | R11 = $(CH_2)_9$ | R12 = $CH_2$—CHMe—$(CH_2)_6$ | m = 3.5, n = 6.5 | Formula (4) | | R41 = $CH_2$—CEtBu—$CH_2$ | s = 4.6 |
| 9 | G-9 | F-9 | Formula (1) | R11 = $(CH_2)_5$ | R12 = $(CH_2)_6$ | m, n = 6.9 | Formula (2) | | o = 9.1, p = 5.5 | |
| 10 | G-10 | F-10 | Formula (1) | R11 = $(CH_2)_4$ | R12 = $(CH_2)_6$ | m = 10.7, n = 4.6 | Formula (2) | | o = 9.1, p = 5.5 | |
| 11 | G-11 | F-11 | Formula (1) | R11 = $(CH_2)_3$ | R12 = $(CH_2)_4$ | m, n = 8.8 | Formula (2) | | o = 9.1, p = 5.5 | |
| 12 | G-12 | F-12 | Formula (1) | R11 = $(CH_2)_4$ | R12 = $(CH_2)_6$ | m = 14.5, n = 1.6 | Formula (2) | | o = 9.1; p = 5.5 | |
| 13 | G-13 | F-13 | Formula (1) | R11 = $(CH_2)_6$ | R12 = $(CH_2)_2$—CHMe—$(CH_2)_2$ | m, n = 6.5 | Formula (2) | | o = 9.1, p = 5.5 | |
| 14 | G-14 | F-14 | Formula (1) | R11 = $(CH_2)_6$ | R12 = $(CH_2)_2$—CHMe—$(CH_2)_2$ | m = 1.3, n = 11.8 | Formula (2) | | o = 9.1, p = 5.5 | |
| 15 | G-15 | F-15 | Formula (1) | R11 = $(CH_2)_6$ | R12 = $(CH_2)_2$—CHMe—$(CH_2)_2$ | m = 2.0, n = 18.0 | Formula (2) | | o = 9.1, p = 5.5 | |
| 16 | G-16 | F-16 | Formula (1) | R11 = $(CH_2)_9$ | R12 = $CH_2$—CHMe—$(CH_2)_6$ | m = 6.5, n = 3.5 | Formula (2) | | o = 9.1, p = 5.5 | |
| 17 | G-17 | F-17 | Formula (1) | R11 = $(CH_2)_9$ | R12 = $CH_2$—CHMe—$(CH_2)_8$ | m = 3.5, n = 6.5 | Formula (2) | | o = 9.1, p = 5.5 | |
| 18 | G-18 | F-18 | Formula (2) | | o = 9.1, p = 5.5 | | Formula (1) | R11 = $(CH_2)_6$ | R12 = $CH_2$—CH < $(CH_2)_2$ > CH—$CH_2$ $(CH_2)_2$ | m, n = 2.7 |
| 19 | G-19 | F-19 | Formula (2) | | o = 9.1, p = 5.5 | | Formula (1) | R11 = $(CH_2)_6$ | R12 = $CH_2$—CH < $(CH_2)_2$ > CH—$CH_2$ $(CH_2)_2$ | m = 4.1, n = 1.4 |
| 20 | G-20 | F-20 | Formula (3) | R31 = $(CH_2)_3$ | R32 = $(CH_2)_4$ | q = 12, r = 5.1 | Formula (4) | | R41 = $(CH_2)_6$ | s = 13.2 |
| 21 | G-21 | F-21 | Formula (3) | R31 = $(CH_2)_6$ | R32 = $(CH_2)_8$ | q = 2.7, r = 6.3 | Formula (4) | | R41 = $(CH_2)_8$ | s = 13.2 |
| 22 | G-22 | F-22 | Formula (4) | | R41 = $(CH_2)_8$ | s = 13.2 | Formula (2) | | o = 9.1, p = 5.5 | |

TABLE 14-2

| Example | Electrophotographic roller No. | Structure of additive |
|---|---|---|
| 1 | G-1 | Formula (5) R51 = $C_4H_9$ t, u = 17 |
| 2 | G-2 | Formula (5) R51 = $C_4H_9$ t, u = 17 |
| 3 | G-3 | Formula (5) R51 = $C_4H_9$ t, u = 17 |
| 4 | G-4 | Formula (5) R51 = $C_4H_9$ t, u = 17 |
| 5 | G-5 | Formula (5) R51 = $C_4H_9$ t, u = 17 |
| 6 | G-6 | Formula (5) R51 = $C_4H_9$ t, u = 17 |
| 7 | G-7 | Formula (5) R51 = $C_4H_9$ t, u = 17 |
| 8 | G-8 | Formula (5) R51 = $C_4H_9$ t, u = 17 |
| 9 | G-9 | Formula (5) R51 = $C_4H_9$ t, u = 17 |
| 10 | G-10 | Formula (5) R51 = $C_4H_9$ t, u = 17 |
| 11 | G-11 | Formula (5) R51 = $C_4H_9$ t, u = 17 |
| 12 | G-12 | Formula (5) R51 = $C_4H_9$ t, u = 17 |
| 13 | G-13 | Formula (5) R51 = $C_4H_9$ t, u = 17 |

TABLE 14-2-continued

| Example | Electrophotographic roller No. | Structure of additive |
|---|---|---|
| 14 | G-14 | Formula (5) R51 = $C_4H_9$ t, u = 17 |
| 15 | G-15 | Formula (5) R51 = $C_4H_9$ t, u = 17 |
| 16 | G-16 | Formula (5) R51 = $C_4H_9$ t, u = 17 |
| 17 | G-17 | Formula (5) R51 = $C_4H_9$ t, u = 17 |
| 18 | G-18 | Formula (5) R51 = $C_4H_9$ t, u = 17 |
| 19 | G-19 | Formula (5) R51 = $C_4H_9$ t, u = 17 |
| 20 | G-20 | Formula (5) R51 = $C_4H_9$ t, u = 17 |
| 21 | G-21 | Formula (5) R51 = $C_4H_9$ t, u = 17 |
| 22 | G-22 | Formula (5) R51 = $C_4H_9$ t, u = 17 |

In the table. Me represents a methyl group. Et represents an ethyl group, and Bu represents a butyl group.

TABLE 14-3

| Example | Electrophotographic roller No. | Coating liquid for forming resin layer No. | Structure of binder resin Structure I | Structure of binder resin Structure II |
|---|---|---|---|---|
| 23 | G-23 | F-23 | Formula (2) o = 9.1, p = 5.5 | Formula (4) R41 = $CH_2$—CH < $(CH_2)_2$ > CH—$CH_2$ $(CH_2)_2$ s = 5.8 |
| 24 | G-24 | F-24 | Formula (2) o = 9.1, p = 5.5 | Formula (4) R41 = $CH_2$—CEtBu—$CH_2$ s = 4.6 |
| 25 | G-25 | F-25 | Formula (1) R11 = $(CH_2)_5$ R12 = $(CH_2)_6$ m, n = 6.9<br>Formula (2) o = 9.1, p = 5.5 | Formula (4) R41 = $(CH_2)_6$ s = 13.2 |
| 26 | G-26 | F-26 | Formula (1) R11 = $(CH_2)_5$ R12 = $(CH_2)_6$ m, n = 6.9 | Formula (2) o = 9.1, p = 5.5 |
| 27 | G-27 | F-27 | Formula (1) R11 = $(CH_2)_5$ R12 = $(CH_2)_6$ m, n = 6.9 | Formula (4) R41 = $(CH_2)_6$ s = 13.2 |
| 28 | G-28 | F-28 | Formula (1) R11 = $(CH_2)_5$ R12 = $(CH_2)_6$ m, n = 6.9 | Formula (4) R41 = $(CH_2)_6$ s = 13.2 |
| 29 | G-29 | F-29 | Formula (1) R11 = $(CH_2)_5$ R12 = $(CH_2)_6$ m, n = 6.9 | Formula (4) R41 = $(CH_2)_6$ s = 13.2 |
| 30 | G-30 | F-30 | Formula (1) R11 = $(CH_2)_5$ R12 = $(CH_2)_6$ m, n = 6.9 | Formula (4) R41 = $(CH_2)_6$ s = 13.2 |
| 31 | G-31 | F-31 | Formula (1) R11 = $(CH_2)_5$ R12 = $(CH_2)_6$ m, n = 6.9 | Formula (4) R41 = $(CH_2)_6$ s = 13.2 |
| 32 | G-32 | F-32 | Formula (1) R11 = $(CH_2)_5$ R12 = $(CH_2)_6$ m, n = 6.9 | Formula (4) R41 = $(CH_2)_6$ s = 13.2 |
| 33 | G-33 | F-33 | Formula (1) R11 = $(CH_2)_5$ R12 = $(CH_2)_6$ m, n = 6.9 | Formula (4) R41 = $(CH_2)_6$ s = 13.2 |
| 34 | G-34 | F-34 | Formula (1) R11 = $(CH_2)_5$ R12 = $(CH_2)_6$ m, n = 6.9 | Formula (4) R41 = $(CH_2)_6$ s = 13.2 |
| 35 | G-35 | F-35 | Formula (1) R11 = $(CH_2)_5$ R12 = $(CH_2)_6$ m, n = 6.9 | Formula (4) R41 = $(CH_2)_6$ s = 13.2 |
| 36 | G-36 | F-36 | Formula (1) R11 = $(CH_2)_5$ R12 = $(CH_2)_6$ m, n = 6.9 | Formula (4) R41 = $(CH_2)_6$ s = 13.2 |
| 37 | G-37 | F-37 | Formula (1) R11 = $(CH_2)_5$ R12 = $(CH_2)_6$ m, n = 6.9 | Formula (4) R41 = $(CH_2)_6$ s = 13.2 |
| 38 | G-38 | F-38 | Formula (1) R11 = $(CH_2)_5$ R12 = $(CH_2)_6$ m, n = 6.9 | Formula (4) R41 = $(CH_2)_6$ s = 13.2 |
| 39 | G-39 | F-39 | Formula (1) R11 = $(CH_2)_5$ R12 = $(CH_2)_6$ m, n = 6.9 | Formula (4) R41 = $(CH_2)_6$ s = 13.2 |
| 40 | G-40 | F-40 | Formula (1) R11 = $(CH_2)_5$ R12 = $(CH_2)_6$ m, n = 6.9. | Formula (4) R41 = $(CH_2)_6$ s = 13.2 |
| 41 | G-41 | F-41 | Formula (1) R11 = $(CH_2)_5$ R12 = $(CH_2)_6$ m, n = 6.9 | Formula (4) R41 = $(CH_2)_6$ s = 13.2 |
| 42 | G-42 | F-42 | Formula (1) R11 = $(CH_2)_5$ R12 = $(CH_2)_6$ m, n = 6.9 | Formula (4) R41 = $(CH_2)_6$ s = 13.2 |
| 43 | G-43 | F-43 | Formula (1) R11 = $(CH_2)_5$ R12 = $(CH_2)_6$ m, n = 6.9 | Formula (4) R41 = $(CH_2)_6$ s = 13.2 |
| 44 | G-44 | F-44 | Formula (1) R11 = $(CH_2)_5$ R12 = $(CH_2)_6$ m, n = 6.9 | Formula (4) R41 = $(CH_2)_6$ s = 13.2 |

TABLE 14-4

| Example | Electro-photographic roller No. | Structure of additive | | |
|---|---|---|---|---|
| 23 | G-23 | Formula (5) | R51 = $C_4H_9$ | t, u = 17 |
| 24 | G-24 | Formula (5) | R51 = $C_4H_9$ | t, u = 17 |
| 25 | G-25 | Formula (5) | R51 = $C_4H_9$ | t, u = 17 |
| 26 | G-26 | Formula (5) | R51 = $C_4H_9$ | t, u = 17 |
| 27 | G-27 | Formula (5) | R51 = $C_4H_9$ | t, u = 17 |
| 28 | G-28 | Formula (5) | R51 = $C_4H_9$ | t, u = 17 |
| 29 | G-29 | Formula (5) | R51 = $C_4H_9$ | t, u = 30 |
| 30 | G-30 | Formula (5) | R51 = $C_4H_9$ | t = 9, u = 10 |
| 31 | G-31 | Formula (5) | R51 = $C_{12}H_{25}$ | t, u = 5 |
| 32 | G-32 | Formula (5) | R51 = $C_{12}H_{25}$ | t, u = 25 |
| 33 | G-33 | Formula (5) | R51 = $C_8H_{17}$ | t, u = 15 |
| 34 | G-34 | Formula (5) | R51 = $CH_3$ | t, u = 12 |

TABLE 14-4-continued

| Example | Electro-photographic roller No. | Structure of additive | | |
|---|---|---|---|---|
| 35 | G-35 | Formula (6) | R61 = $CH_3$ | v = 6, w = 29 |
| 36 | G-36 | Formula (6) | R61 = $CH_3$ | v = 6, w = 29 |
| 37 | G-37 | Formula (6) | R61 = $CH_3$ | v = 6, w = 29 |
| 38 | G-38 | Formula (6) | R61 = $CH_3$ | v = 1, w = 9 |
| 39 | G-39 | Formula (6) | R61 = $C_8H_{17}$ | v, w = 15 |
| 40 | G-40 | Formula (7) | R71 = $C_{12}H_{25}$ | x = 5 |
| 41 | G-41 | Formula (7) | R71 = $C_{12}H_{25}$ | x = 5 |
| 42 | G-42 | Formula (7) | R71 = $C_{12}H_{25}$ | x = 5 |
| 43 | G-43 | Formula (7) | R71 = $CH_3$ | x = 11 |
| 44 | G-44 | Formula (7) | R71 = $C_8H_{17}$ | x = 14 |

TABLE 14-5

| | | Physical properties of carbon | | | | | Maximum |
|---|---|---|---|---|---|---|---|
| Example | Electrophotographic roller No. | Primary particle diameter [nm] | DBP absorption amount [ml/100 g] | pH | X | Impedance [Ω] | value of surface electric potential [V] |
| 1 | G-1 | 24 | 51 | 2.5 | 3.2 | 9.12E+06 | 5.7 |
| 2 | G-2 | 24 | 51 | 2.5 | 3.2 | 8.67E+06 | 12.5 |
| 3 | G-3 | 24 | 51 | 2.5 | 3.2 | 2.32E+07 | 5.5 |
| 4 | G-4 | 24 | 51 | 2.5 | 3.3 | 1.69E+07 | 6.2 |
| 5 | G-5 | 24 | 51 | 2.5 | 3.2 | 7.41E+06 | 14.2 |
| 6 | G-6 | 24 | 51 | 2.5 | 3.2 | 6.52E+06 | 8.1 |
| 7 | G-7 | 24 | 51 | 2.5 | 3.3 | 1.52E+07 | 13.2 |
| 8 | G-8 | 24 | 51 | 2.5 | 3.2 | 7.01E+06 | 10.5 |
| 9 | G-9 | 24 | 51 | 2.5 | 3.2 | 2.79E+06 | 3.2 |
| 10 | G-10 | 24 | 51 | 2.5 | 3.2 | 2.68E+06 | 2.8 |
| 11 | G-11 | 24 | 51 | 2.5 | 3.2 | 1.52E+06 | 3.2 |
| 12 | G-12 | 24 | 51 | 2.5 | 3.2 | 2.83E+06 | 4.5 |
| 13 | G-13 | 24 | 51 | 2.5 | 3.2 | 3.82E+06 | 4.2 |
| 14 | G-14 | 24 | 51 | 2.5 | 3.2 | 3.51E+06 | 3.6 |
| 15 | G-15 | 24 | 51 | 2.5 | 3.3 | 3.39E+06 | 5.1 |
| 16 | G-16 | 24 | 51 | 2.5 | 3.2 | 4.11E+06 | 4.7 |
| 17 | G-17 | 24 | 51 | 2.5 | 3.2 | 4.22E+06 | 3.9 |
| 18 | G-18 | 24 | 51 | 2.5 | 3.2 | 1.89E+06 | 2.6 |
| 19 | G-19 | 24 | 51 | 2.5 | 3.2 | 1.57E+06 | 3.1 |
| 20 | G-20 | 24 | 51 | 2.5 | 3.2 | 2.11E+06 | 3.5 |
| 21 | G-21 | 24 | 51 | 2.5 | 3.2 | 1.98E+06 | 3.8 |
| 22 | G-22 | 24 | 51 | 2.5 | 3.2 | 2.36E+06 | 3.2 |
| 23 | G-23 | 24 | 51 | 2.5 | 3.2 | 2.25E+06 | 2.9 |
| 24 | G-24 | 24 | 51 | 2.5 | 3.2 | 3.55E+06 | 3.6 |
| 25 | G-25 | 24 | 51 | 2.5 | 3.2 | 5.01E+06 | 4.5 |
| 26 | G-26 | 24 | 51 | 2.5 | 3.2 | 3.11E+06 | 3.5 |
| 27 | G-27 | 24 | 51 | 2.5 | 3.0 | 8.58E+06 | 4.5 |
| 28 | G-28 | 24 | 51 | 2.5 | 7.0 | 6.55E+06 | 7.2 |
| 29 | G-29 | 24 | 51 | 2.5 | 3.2 | 7.92E+06 | 6.8 |
| 30 | G-30 | 24 | 51 | 2.5 | 3.2 | 7.71E+06 | 6.4 |
| 31 | G-31 | 24 | 51 | 2.5 | 3.2 | 6.31E+06 | 5.9 |
| 32 | G-32 | 24 | 51 | 2.5 | 3.2 | 5.47E+06 | 5.7 |
| 33 | G-33 | 24 | 51 | 2.5 | 3.2 | 7.21E+06 | 6.9 |
| 34 | G-34 | 24 | 51 | 2.5 | 3.2 | 6.74E+06 | 6.3 |
| 35 | G-35 | 24 | 51 | 2.5 | 3.2 | 6.32E+06 | 5.1 |
| 36 | G-36 | 24 | 51 | 2.5 | 3.0 | 5.89E+06 | 5.2 |
| 37 | G-37 | 24 | 51 | 2.5 | 7.0 | 5.84E+06 | 4.9 |
| 38 | G-38 | 24 | 51 | 2.5 | 3.2 | 5.10E+06 | 3.9 |
| 39 | G-39 | 24 | 51 | 2.5 | 3.2 | 2.80E+06 | 4.8 |
| 40 | G-40 | 24 | 51 | 2.5 | 3.2 | 2.25E+06 | 4.5 |
| 41 | G-41 | 24 | 51 | 2.5 | 3.0 | 2.11E+06 | 3.8 |
| 42 | G-42 | 24 | 51 | 2.5 | 7.0 | 2.37E+06 | 4.2 |
| 43 | G-43 | 24 | 51 | 2.5 | 3.2 | 2.15E+06 | 3.8 |
| 44 | G-44 | 24 | 51 | 2.5 | 3.2 | 2.27E+06 | 3.8 |

In the table. X is the total amount (mass %) of the compounds having structures represented by the structural formulae (5) to (7) on the basis of the solid content in the coating for forming the surface layer.

The value of the impedance represents the minimum value of the values of the impedance at a frequency of $1.0\times10^0$ Hz to $1.0\times10^1$ Hz. The expression such as "9.12E+06" represents "$9.12\times10^6$".

TABLE 14-6

| | | State of dispersion of carbon black | | | | | | | |
|---|---|---|---|---|---|---|---|---|---|
| | | Circle-equivalent diameter of dispersion | | | Distance between wall surfaces | | | | |
| Example | Electrophotographic roller No. | Average value Rc [nm] | Standard deviation σc [nm] | σc/Rc | Average value d [nm] | Standard deviation σd [nm] | σd/d | Fogging evaluation | Image density stability |
| 1 | G-1 | 55.2 | 33.1 | 0.600 | 111.6 | 64.1 | 0.574 | 1.2 | 0.04 |
| 2 | G-2 | 55.9 | 32.9 | 0.589 | 108.9 | 62.1 | 0.570 | 2.7 | 0.03 |
| 3 | G-3 | 49.2 | 27.3 | 0.555 | 98.2 | 54.8 | 0.558 | 1.3 | 0.01 |
| 4 | G-4 | 51.7 | 29.6 | 0.573 | 97.9 | 55.2 | 0.564 | 1.2 | 0.02 |
| 5 | G-5 | 52.1 | 31.1 | 0.597 | 102.3 | 57.2 | 0.559 | 2.9 | 0.03 |
| 6 | G-6 | 53.3 | 30.8 | 0.578 | 103.5 | 57.8 | 0.558 | 1.4 | 0.04 |
| 7 | G-7 | 51.3 | 31.2 | 0.608 | 101.5 | 58.2 | 0.573 | 2.6 | 0.02 |
| 8 | G-8 | 50.9 | 30.1 | 0.591 | 101.8 | 57.9 | 0.569 | 2.3 | 0.03 |
| 9 | G-9 | 54.3 | 31.8 | 0.586 | 100.7 | 56.9 | 0.565 | 1.0 | 0.08 |
| 10 | G-10 | 53.0 | 32.1 | 0.606 | 102.3 | 57.6 | 0.563 | 0.8 | 0.07 |
| 11 | G-11 | 59.2 | 38.0 | 0.642 | 103.8 | 57.2 | 0.551 | 0.9 | 0.09 |
| 12 | G-12 | 57.1 | 34.9 | 0.611 | 104.3 | 58.0 | 0.556 | 1.1 | 0.06 |
| 13 | G-13 | 53.0 | 32.0 | 0.604 | 105.6 | 57.9 | 0.548 | 1.1 | 0.05 |
| 14 | G-14 | 55.1 | 32.2 | 0.584 | 106.5 | 60.2 | 0.565 | 1.0 | 0.06 |
| 15 | G-15 | 54.2 | 32.2 | 0.594 | 106.1 | 59.9 | 0.565 | 1.3 | 0.07 |
| 16 | G-16 | 51.4 | 30.1 | 0.586 | 105.8 | 60.2 | 0.569 | 1.2 | 0.05 |
| 17 | G-17 | 52.2 | 32.4 | 0.621 | 103.5 | 60.2 | 0.582 | 0.9 | 0.05 |
| 18 | G-18 | 58.1 | 34.1 | 0.587 | 106.8 | 61.0 | 0.571 | 0.7 | 0.07 |
| 19 | G-19 | 57.1 | 35.2 | 0.616 | 107.6 | 61.2 | 0.569 | 0.8 | 0.07 |
| 20 | G-20 | 58.0 | 34.7 | 0.598 | 106.5 | 60.9 | 0.572 | 1.0 | 0.08 |
| 21 | G-21 | 59.1 | 34.9 | 0.591 | 104.9 | 61.1 | 0.582 | 0.9 | 0.08 |
| 22 | G-22 | 58.2 | 35.3 | 0.607 | 105.8 | 60.9 | 0.576 | 1.0 | 0.08 |
| 23 | G-23 | 56.1 | 35.2 | 0.627 | 106.8 | 60.9 | 0.570 | 0.7 | 0.07 |
| 24 | G-24 | 57.3 | 35.4 | 0.618 | 103.5 | 58.8 | 0.568 | 1.1 | 0.06 |
| 25 | G-25 | 54.3 | 34.1 | 0.628 | 102.7 | 58.1 | 0.566 | 1.3 | 0.04 |
| 26 | G-26 | 53.1 | 33.3 | 0.627 | 100.2 | 57.6 | 0.575 | 0.7 | 0.07 |
| 27 | G-27 | 57.4 | 34.5 | 0.601 | 99.8 | 56.6 | 0.567 | 0.9 | 0.03 |
| 28 | G-28 | 56.1 | 34.2 | 0.610 | 101.2 | 57.0 | 0.563 | 1.8 | 0.04 |
| 29 | G-29 | 57.2 | 34.0 | 0.594 | 103.5 | 58.1 | 0.561 | 1.4 | 0.03 |
| 30 | G-30 | 57.0 | 34.9 | 0.612 | 98.7 | 56.7 | 0.574 | 1.3 | 0.04 |
| 31 | G-31 | 56.2 | 34.5 | 0.614 | 101.7 | 57.1 | 0.561 | 1.3 | 0.03 |
| 32 | G-32 | 55.2 | 34.2 | 0.620 | 102.4 | 58.0 | 0.566 | 1.1 | 0.03 |
| 33 | G-33 | 56.7 | 33.8 | 0.596 | 100.8 | 57.4 | 0.569 | 1.5 | 0.04 |
| 34 | G-34 | 57.2 | 35.1 | 0.614 | 100.7 | 56.9 | 0.565 | 1.3 | 0.04 |
| 35 | G-35 | 55.0 | 32.0 | 0.582 | 102.3 | 57.4 | 0.561 | 1.1 | 0.03 |
| 36 | G-36 | 55.1 | 33.1 | 0.601 | 103.8 | 56.9 | 0.548 | 1.0 | 0.04 |
| 37 | G-37 | 56.1 | 33.8 | 0.602 | 104.6 | 57.3 | 0.548 | 1.0 | 0.05 |
| 38 | G-38 | 55.7 | 33.5 | 0.601 | 105.7 | 61.0 | 0.577 | 1.0 | 0.04 |
| 39 | G-39 | 58.2 | 35.2 | 0.605 | 114.6 | 67.4 | 0.588 | 1.2 | 0.07 |
| 40 | G-40 | 59.0 | 37.9 | 0.642 | 130.3 | 77.6 | 0.596 | 1.3 | 0.07 |
| 41 | G-41 | 58.2 | 37.1 | 0.637 | 135.6 | 78.9 | 0.582 | 0.9 | 0.08 |
| 42 | G-42 | 58.3 | 37.2 | 0.638 | 137.8 | 78.2 | 0.567 | 1.1 | 0.07 |
| 43 | G-43 | 58.9 | 37.0 | 0.628 | 143.5 | 83.2 | 0.580 | 0.8 | 0.08 |
| 44 | G-44 | 57.9 | 37.2 | 0.642 | 127.5 | 74.1 | 0.581 | 1.0 | 0.08 |

Comparative Example 1

The Materials in the amounts shown in Table 15 below were put into a reaction vessel, and were stirred. Next, 2-butanone (MEK) was added so that the total solid content ratio was 30 mass %, and thereafter, the resultant was mixed in a sand mill. Next, 2-butanone (MEK) was added so that the viscosity of the resultant liquid was adjusted to be within the range of 6 to 10 mPa·s. Then, the coating for forming a resin layer F-45 was produced. The electrophotographic roller G-45 was produced and evaluated in the same manner as in example 1 except that the coating for forming a resin layer F-1 was changed to the coating for forming a resin layer F-45. The evaluation results are shown in Table 19-2.

TABLE 15

| Material | Parts by mass |
|---|---|
| Polytetramethylene glycol ether polyol (Trade name: PTG1000SN, Manufactured by Hodogaya Chemical Co., Ltd.) | 25 |
| Polycarbonate polyol (Trade name: T5651, Manufactured by Asahi-Kasei Chemicals Corporation) | 75 |
| Isocyanate (Trade name: Coronate HX, Manufactured by Tosoh Corporation) | 55.5 |
| Carbon black (Trade name: MA8, Manufactured by Mitsubishi Chemical Corporation) | 30 |
| Roughening particle (Trade name: ART PEARL C-400T, Manufactured by Negami Chemical Industrial Co., Ltd.) | 20 |

Comparative Examples 2 and 3

The coatings for forming a resin layer F-46 and F-47, and the electrophotographic rollers G-46 and G-47 were produced, and evaluation was performed in the same manner as in example 1 except that the carbon black used in the coating for forming a resin layer F-1 was changed to the materials shown in Table 16 below. The evaluation results are shown in Table 19-2.

TABLE 16

| | Electrophotographic roller No. | Coating liquid for forming resin layer No. | Material of carbon black: Name of material | Primary particle diameter [nm] | DBP absorption amount [ml/100 g] | pH |
|---|---|---|---|---|---|---|
| Example 1 | G-1 | F-1 | MA8 (Manufactured by Mitsubishi Chemical Corporation) | 24 | 51 | 2.5 |
| Comparative example 2 | G-46 | F-46 | MA230 (Manufactured by Mitsubishi Chemical Corporation) | 30 | 113 | 3 |
| Comparative example 3 | G-47 | F-47 | MA14 (Manufactured by Mitsubishi Chemical Corporation) | 40 | 73 | 3 |

Comparative Examples 4 to 6

The coatings for forming a resin layer F-48 to F-50, and the electrophotographic rollers G-48 to G-50 were produced and evaluation was performed in the same manner as in example 1 except that the additive used in the coating for forming a resin layer F-1 was changed to the materials in parts by mass shown in Table 17 below. The evaluation results are shown in Table 19-2.

TABLE 17

| | Electrophotographic roller No. | Coating liquid for forming resin layer No. | Additive: Material | Additive: Parts by mass |
|---|---|---|---|---|
| Example 1 | G-1 | F-1 | E-1 | 7 |
| Comparative example 4 | G-48 | F-48 | E-1 | 5.25 |
| Comparative example 5 | G-49 | F-49 | Silane coupling agent (Trade name: A-187, Manufactured by Momentive Performance Materials, Inc.) | 14 |
| Comparative example 6 | G-50 | F-50 | Polymer dispersant (Trade name: Disper byk-185, Manufactured by BYK-Chemie GmbH) | 24.5 |

Comparative Example 7

The coating for forming a resin layer F-51, and the electrophotographic roller G-51 were produced and evaluation was performed in the same manner as in example 1 except that the additive used in the coating for forming a resin layer F-1 was changed to E-14 shown in Table 18 below. The evaluation results are shown in Table 19-2.

Comparative Example 8

Synthesis of Additive E-15

The additive E-15, which was a polyetheramine, was obtained by synthesizing a polyoxyethylene polyoxypropylene decyl ether, and thereafter, ketonizing the resultant by the oxidation of a secondary alcohol, and subjecting the resultant to reductive amination.

Synthesis of Polyoxyethylene Polyoxypropylene Decyl Ether

To an autoclave provided with a stirring device, a temperature controlling device, and an autoloading device, 205.8 g of 1-decanol (manufactured by Tokyo Chemical Industry Co., Ltd.), and 3.0 g of potassium hydroxide were put, and dehydrated at 110° C. at 1.2 kPa for 30 minutes. After the dehydration, nitrogen substitution was performed, the temperature was raised to 150° C., and thereafter, 858.0 g of ethylene oxide (to a 15 mol alcohol) was loaded. The reaction was allowed to occur at 150° C. for 1 hour, and then, an ethylene oxide adduct having an average addition mol number of 15 mol was obtained.

The obtained ethylene oxide adduct was cooled to 130° C., and thereafter, 1132.6 g of propylene oxide (to a 15 mol alcohol) was loaded. After the loading, the reaction was allowed to occur at 130° C. for 5 hours, and a polyoxyethylene polyoxypropylene decyl ether adduct that was a block polymer of ethylene oxide having an average addition mol number of 15 mol, and propylene oxide having an average addition mol number of 15 mol was obtained.

The obtained polyoxyethylene polyoxypropylene octyl decyl adduct was cooled to 80° C., and unreacted ethylene oxide and propylene oxide were removed at 2.5 kPa for 30 minutes. Next, 6.0 g of 90% lactic acid was put in the autoclave to be stirred at 80° C. for 30 minutes, and thereafter was subjected to extraction. Then, a polyoxyethylene polyoxypropylene decyl ether was obtained.

Synthesis of Polyetheramine E-15

An agitator was attached to a three-neck flask, and 1688 g of the polyoxyethylene polyoxypropylene decyl ether and 460 mL of acetic acid were put into the flask. To the resultant, 600 mL of a 2 mol/L sodium hypochlorite aqueous solution was added dropwise over 1 hour. The reaction vessel was put in an ice bath to be cooled so that the temperature was within the range of 15° C. to 25° C. After the addition, the resultant was continuously stirred for 1 hour. Dichloromethane was added to the obtained liquid, an aqueous layer was extracted, and the resultant was subjected to a post-treatment and refined using a column, and then, a compound of a ketonized secondary alcohol was obtained.

The temperature was cooled down to 0° C. by the ice bath, 250 mL of a methanol-acetic acid mixed solution (the capacity ratio was 10:1) was added to 41.4 g of the obtained compound of the ketonized secondary alcohol, and 2.7 g of 2-picoline borane was further added. The ice bath was removed, and the resultant was stirred in an open system at room temperature overnight. The resultant was concentrated, and thereafter cooled to 0° C., 360 mL of a 35% hydrochloric acid aqueous solution was added, and the resultant was stirred at room temperature for 2 hours. A sodium hydroxide aqueous solution was added to basify the resultant, an aqueous layer was extracted using dichloromethane, and the resultant was subjected to a post-treatment and refined using a column, and then, the polyetheramine E-15 was obtained. The structure of R61, and the values of v and w of E-15 are shown in Table 18.

Synthesis of Coating for Forming Resin Layer F-52, and Electrophotographic Roller G-52

The coating for forming a resin layer F-52, and the electrophotographic roller G-52 were produced and evaluation was performed in the same manner as in example 1 except that the additive used in the coating for forming a resin layer F-1 was changed to the additive E-15. The evaluation results are shown in Table 19-2.

Comparative Example 9

Synthesis of Additive E-16

To an autoclave provided with a stirring device, a temperature controlling device, and an autoloading device, 315.2 g of 1-hexadecanol (manufactured by Tokyo Chemical Industry Co., Ltd.), and 3.0 g of potassium hydroxide were put, and dehydrated at 110° C. at 1.2 kPa for 30 minutes. After the dehydration, nitrogen substitution was performed, the temperature was raised to 150° C., and thereafter, 858.0 g of ethylene oxide (to a 15 mol alcohol) was loaded. The reaction was allowed to occur at 150° C. for 1 hour, and then, an ethylene oxide adduct having an average addition mol number of 15 mol was obtained.

Mixed were 90.2 g of the obtained ethylene oxide adduct and 510 mL of a 1 mol/L sodium hydroxide aqueous solution, 71.1 g of potassium permanganate was added, and the resultant was stirred at room temperature for 6 hours. Thereafter, 760 mL of 2-propanol was added, the resultant was stirred for 1 hour to quench excessive potassium permanganate, and further, manganese oxide, which was a by-product, was filtrated off. An aqueous layer was extracted with dichloromethane, the resultant was refined, and then, E-16, which was a polyoxyethylene methyl ether acetic acid, was obtained. The structure of R71, and the value x of E-16 are shown in Table 18.

Synthesis of Coating for Forming Resin Layer F-53, and Electrophotographic Roller G-53

The coating for forming a resin layer F-53, and the electrophotographic roller G-53 were produced and evaluation was performed in the same manner as in example 1 except that the additive used in the coating for forming a resin layer F-1 was changed to the additive E-16. The evaluation results are shown in Table 19-2.

TABLE 18

| No. | Material | Structure | | |
|---|---|---|---|---|
| E-14 | Polyoxyethylene polyoxypropylene cetyl ether (Trade name: UNISAFE 20P-8, Manufactured by NOF CORPORATION) | Formula (5) | R51 = $C_{16}H_{33}$ | t = 20, u = 8 |
| E-15 | Polyetheramine | Formula (6) | R61 = $C_{10}H_{21}$ | v, w = 15 |
| E-16 | Polyoxyethylene hexadecyl ether acetic acid | Formula (7) | R71 = $C_{16}H_{33}$ | x = 14 |

TABLE 19-1

| | | Physical properties of carbon black | | | | | Maximum |
|---|---|---|---|---|---|---|---|
| Comparative example | Electrophotographic roller No. | Primary particle diameter [nm] | DBP absorption amount [ml/100 g] | pH | X | Impedance [Ω] | value of surface electric potential [V] |
| 1 | G-45 | 24 | 51 | 2.5 | — | 3.96E+05 | 3.7 |
| 2 | G-46 | 30 | 113 | 3.0 | — | 2.25E+04 | 2.4 |
| 3 | G-47 | 40 | 73 | 3.0 | — | 1.59E+05 | 8.7 |
| 4 | G-48 | 24 | 51 | 2.5 | 2.4 | 4.56E+05 | 3.5 |
| 5 | G-49 | 24 | 51 | 2.5 | 6.2 | 2.00E+08 | 462.0 |
| 6 | G-50 | 24 | 51 | 2.5 | 10.3 | 4.18E+05 | 4.6 |
| 7 | G-51 | 24 | 51 | 2.5 | 3.2 | 1.56E+05 | 7.6 |
| 8 | G-52 | 24 | 51 | 2.5 | 3.2 | 1.18E+05 | 6.8 |
| 9 | G-53 | 24 | 51 | 2.5 | 3.2 | 8.92E+04 | 2.5 |

TABLE 19-2

| | | State of dispersion of carbon black | | | | | | | |
|---|---|---|---|---|---|---|---|---|---|
| | | Circle-equivalent diameter of dispersion | | | Distance between wall surfaces | | | | |
| Comparative example | Electrophotographic roller No. | Average value Rc | Standard deviation σc | σc/Rc | Average value | Standard deviation σd | σd/d | Fogging Evaluation | Image Density Stability |
| 1 | G-45 | 92.9 | 60.7 | 0.653 | 146.8 | 95.6 | 0.651 | 3.0 | 0.16 |
| 2 | G-46 | 88.0 | 56.0 | 0.636 | 130.1 | 79.5 | 0.611 | 3.2 | 0.21 |
| 3 | G-47 | 104.0 | 79.7 | 0.766 | 205.8 | 130.7 | 0.635 | 4.5 | 0.19 |
| 4 | G-48 | 86.8 | 57.0 | 0.657 | 129.8 | 80.1 | 0.617 | 3.3 | 0.18 |
| 5 | G-49 | 57.0 | 34.0 | 0.596 | 112.7 | 63.8 | 0.566 | 11.2 | 0.27 |
| 6 | G-50 | 87.8 | 55.5 | 0.632 | 130.7 | 79.5 | 0.608 | 3.7 | 0.18 |
| 7 | G-51 | 89.1 | 57.6 | 0.646 | 148.2 | 98.7 | 0.666 | 3.8 | 0.16 |
| 8 | G-52 | 92.0 | 61.0 | 0.663 | 145.7 | 97.6 | 0.670 | 4.3 | 0.19 |
| 9 | G-53 | 96.1 | 65.0 | 0.676 | 152.3 | 100.2 | 0.658 | 5.1 | 0.22 |

In the table. X is the total amount (mass %) of the compounds having structures represented by the structural formulae (5) to (7) on the basis of the solid content in the coating for forming the surface layer.

The value of the impedance represents the minimum value of the values of the impedance at a frequency of $1.0\times10^0$ Hz to $1.0\times10^1$ Hz.

Examples 1 to 44 showed good results in the fogging evaluation, and the image density stability evaluation. The results were especially good when a polyurethane in combination with the structural formulae (1) and (4) which had a polycarbonate structure only was used. It is considered that the case of the combination of the structural formulae (1) and (4), which had a polycarbonate structure only, showed better results because an ester structure was present in each of the structural formulas (2) and (3), and an ester structure is electrically conductive more than a polycarbonate structure.

The results tended to be better when the hydrocarbon groups in R12 of the structural formula (1), and in R41 of the structural formula (4) had side chains. No detailed reasons therefor have been found, but it is considered that the hydrocarbon group in the side chain of the polyurethane structure and the carbon black itself showing a hydrophobic characteristic (the surface functional group of acid carbon black was treated so as to be hydrophilic, but carbon black itself shows a hydrophobic characteristic) interacted with each other. It is conjectured that this improved the dispersibility of the carbon black, and then, better results were shown.

Similarly, the results were better when not only ethylene oxide but also propylene oxide was comprised in the structure of the additive. When the terminated functional group of the additive was a hydroxyl group, the results were the best; when the terminated functional group thereof was an amine, the results were the second best; and when the terminated functional group thereof was carboxylic acid, the results were the third best. It is conjectured that better results were shown because: when the terminated functional group was a hydroxyl group, a urethane-forming reaction could be performed, and the compatibility with a urethane became good; even when the additive was incorporated into the urethane-forming reaction, the electric characteristics of urethane were not inhibited. It is conjectured that the results were a little better when the terminated functional group was a hydroxyl group than when the terminated functional group was an amine because: when the terminated functional group was an amine, a ureation reaction could be performed, and the compatibility with a urethane became moderately good; but when the additive was incorporated into the urethane-forming reaction, the electric characteristics of urethane were influenced.

In contrast, comparative examples 1 to 9 showed poor results in the fogging valuation, and the image density stability evaluation in the structure with a faster processing speed at a higher blade bias.

In comparative example 1, a polyether diol and a polycarbonate diol were used, and both an ether structure and a polycarbonate structure were incorporated in the polyurethane structure. It is considered that as a result, the electric characteristics by the polycarbonate structure were inhibited by the ether structure, and a desired impedance value could not be obtained. It is considered that therefore, good results could not be obtained in the structure with a faster processing speed at a higher blade bias.

In comparative examples 2 and 3, desired impedance values could not be obtained, either, and good results could not be obtained. The reason why the impedance values were smaller was considered to be because a carbon black having a large number average diameter of a primary particle, and a large DBP absorption amount was used, and then, the structure of the carbon black after milling dispersion became large, the dispersed particle size became large, and the distance between the wall surfaces became long.

In comparative example 4, a desired impedance value could not be obtained, either, and good results could not be obtained. The reason why the impedance value was smaller is considered to be because the amount of the additive was small, the dispersibility of the conductive filler was insufficient, and conduction paths by the conductive filler was formed in the surface layer.

In comparative example 5, the surface electric potential was so high that good results could not be obtained in the fogging evaluation and the image density stability evaluation. It is considered that such results were because the surface electric potential became high since the carbon black was covered with an insulating silane coupling agent.

In comparative example 6, the impedance was low, and the results were poor in the fogging evaluation and the image density stability evaluation. The reason why the impedance was low is considered to be because, while a polymer dispersing agent suitable for the dispersion of the carbon black was used, the dispersibility of the carbon black in the resin did not improve, and further the parts of the addition of the dispersing agent were a lot, and the electric characteristics of the resin were influenced.

In comparative examples 7 to 9, the impedance was also low, and the results were poor in the fogging evaluation and the image density stability evaluation. The reason why the impedance was low is considered to be because the carbon chains of R51, R61 and R71 in the structural formulae (5), (6) and (7), which were used in comparative examples 7 to 9, respectively, were beyond desired ranges, the dispersibility of the carbon black decreased, and the impedance was low.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-031188, filed Mar. 1, 2023, which is hereby incorporated by reference herein in its entirety.

What is claimed is:

1. An electrophotographic roller comprising:

a substrate comprising a conductive outer surface; and a resin layer on the outer surface of the substrate, wherein the resin layer comprises a polyurethane having a polycarbonate structure, an impedance at a frequency of $1.0\times10^{0}$ to $1.0\times10^{1}$ Hz is $1.00\times10^{6}\Omega$ or more when the outer surface of the electrophotographic roller is directly provided with a metal film, and, under an environment of 23° C. in temperature and 50% in relative humidity and a DC voltage of 50 V is applied between the outer surface of the substrate and the metal film, and an AC voltage of 50 V in amplitude is also applied while a frequency is changed between $1.0\times10^{-1}$ to $1.0\times10^{5}$ Hz, and a maximum value of an electric potential of the outer surface is less than 20.0 V, when the electrical potential being measured under conditions where in an environment of 23° C. in temperature and 50% in relative humidity, a corona discharger having a grid part of 3.0 mm in width is arranged so that a distance between the grid part and the outer surface of the electrophotographic roller is 1.0 mm, and so that a direction of the width of the grid part and an axial direction of the electrophotographic roller are aligned, a voltage of 8 kV is applied to the grid part, the corona discharger is moved in the axial direction of the electrophotographic roller relatively at a speed of 400 mm/sec to charge the outer surface of the electrophotographic roller, and the electric potential of the outer surface 0.06 seconds after a passage of the grid part is measured.

2. The electrophotographic roller according to claim 1, wherein the polyurethane having the polycarbonate structure satisfies at least two of (A), (B) and (C) below:

(A) the polyurethane has a structure represented by following structural formula (1) in a molecule thereof;

(B) the polyurethane has one or both of a structure represented by following structural formula (2) and a structure represented by following structural formula (3) in a molecule thereof; and (C). the polyurethane has a structure represented by following structural formula (4) in a molecule thereof:

Structural formula (1)

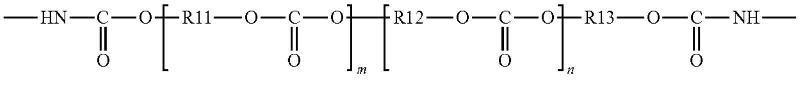

-continued

Structural formula (2)

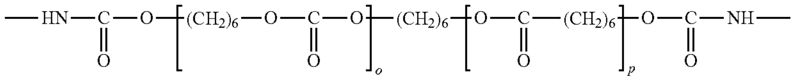

Structural formula (3)

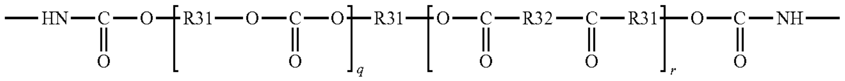

Structural formula (4)

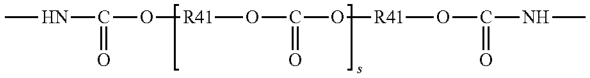

wherein in structural formula (1), R11, R12 and R13 each represent C3-9 divalent hydrocarbon, R11 and R12 are different from each other, R13 is same as at least one selected from a group consisting of R11 and R12, and m and n are average addition mol numbers, and each independently represent a number of 1.0 or more;

in structural formula (2), o and p are average addition mol numbers, and each independently represent a number of 1.0 or more;

in structural formula (3), R31 and R32 each independently represent C3-8 divalent hydrocarbon, and q and r are average addition mol numbers, and each independently represent a number of 1.0 or more; and in structural formula (4), R41 represents C6-9 divalent hydrocarbon, and s is an average addition mol number, and represents a number of 1.0 or more.

3. The electrophotographic roller according to claim 1, wherein the resin layer comprises a conductive filler.

4. The electrophotographic roller according to claim 3, wherein the conductive filler comprises carbon black.

5. The electrophotographic roller according to claim 4, wherein an arithmetic mean value Rc of circle-equivalent diameter of the carbon black in the resin layer is 60.0 nm or less, and when a standard deviation of the circle-equivalent diameter of the carbon black is defined as σc, σc/Rc is 0.000 to 0.650.

6. The electrophotographic roller according to claim 4, wherein an arithmetic mean value d of distance between wall surfaces of the carbon black in the resin layer is 80.0 to 150.0 nm, and when a standard deviation of the distance between wall surfaces is defined as σd, σd/d is 0.000 to 0.600.

7. The electrophotographic roller according to claim 4, wherein a number average diameter of a primary particle of the carbon black in the resin layer is 30 nm or less.

8. The electrophotographic roller according to claim 4, wherein a DBP absorption amount of the carbon black in the resin layer is 90 mL/100 g or less, and a pH of the carbon black is 4.0 or less.

9. The electrophotographic roller according to claim 1, wherein the resin layer comprises at least one selected from a group consisting of a compound having a structure represented by following structural formula (5), a compound having a structure represented by following structural formula (6), and a compound having a structure represented by following structural formula (7):

Structural formula (5)

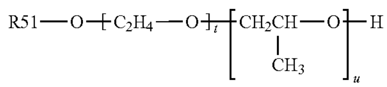

Structural formula (6)

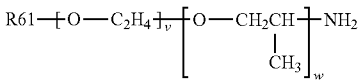

Structural formula (7)

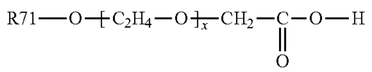

wherein in structural formula (5), R51 represents C1-12 monovalent hydrocarbon, and t and u are average addition mol numbers, and each independently represent a number of 1 or more;

in structural formula (6), R61 represents C1-8 monovalent hydrocarbon, and v and w are average addition mol numbers, and each independently represent a number of 1 or more; and in structural formula (7), R71 represents C1-12 monovalent hydrocarbon, and x is an average addition mol number, and represents a number of 1 or more.

10. The electrophotographic roller according to claim 1, wherein a maximum value of the electric potential is 10.0 V or less.

11. A process cartridge configured to be freely attached to and detached from a main body of an electrophotographic image forming apparatus, wherein the process cartridge is provided with the electrophotographic roller according to claim 1.

12. An electrophotographic image forming apparatus comprising:

a photosensitive member; and a developing roller that supplies a developer to an electrostatic latent image formed on the photosensitive member, wherein the developing roller is the electrophotographic roller according to claim 1.

* * * * *